United States Patent
Grant et al.

(10) Patent No.: US 11,921,743 B2
(45) Date of Patent: Mar. 5, 2024

(54) DYNAMIC PROFILE RECONCILIATION IN GROUP-BASED COMMUNICATION SYSTEMS

(71) Applicant: Salesforce, Inc., San Francisco, CA (US)

(72) Inventors: Myles Grant, San Carlos, CA (US); Elizabeth Clemenson, San Francisco, CA (US); Paul Rosania, San Francisco, CA (US); Sri Vasamsetti, San Francisco, CA (US); Yingyu Sun, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/156,916

(22) Filed: Jan. 25, 2021

(65) Prior Publication Data

US 2021/0240729 A1  Aug. 5, 2021

Related U.S. Application Data

(60) Provisional application No. 62/968,287, filed on Jan. 31, 2020.

(51) Int. Cl.
*G06F 16/00* (2019.01)
*G06F 16/25* (2019.01)
(Continued)

(52) U.S. Cl.
CPC .............. *G06F 16/27* (2019.01); *G06F 16/25* (2019.01); *H04L 67/306* (2013.01)

(58) Field of Classification Search
CPC ................................. G06F 16/27; G06F 16/25
See application file for complete search history.

(56) References Cited

U.S. PATENT DOCUMENTS

| | | | | |
|---|---|---|---|---|
| 8,131,685 B1 * | 3/2012 | Gedalius | .............. | G06Q 10/107 |
| | | | | 707/662 |
| 10,305,845 B1 * | 5/2019 | Waagen | ................ | H04L 67/306 |
| | | (Continued) | | |

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Khanh B Pham
(74) *Attorney, Agent, or Firm* — Lee & Hayes, P.C.

(57) ABSTRACT

Techniques for performing dynamic profile reconciliation in a communication system. A server computing system may identify two or more user profiles corresponding to a same user that is associated with the communication system. The server computing system may integrate historical data associated with the two or more user profiles into a single user profile (e.g., a destination user profile). The historical data may include messages sent and/or received via the two or more user profiles, files associated with the messages, metadata corresponding to each message, and the like. Responsive to combining the two or more user profiles into the single user profile, the server computing system may delete at least one of the two or more user profiles, storing the combined data in association with the single user profile.

20 Claims, 12 Drawing Sheets

(51) Int. Cl.
*G06F 16/27* (2019.01)
*H04L 67/306* (2022.01)

(56) References Cited

U.S. PATENT DOCUMENTS

| | | | | |
|---|---|---|---|---|
| 2005/0228680 | A1* | 10/2005 | Malik | H04L 51/04 |
| | | | | 705/26.1 |
| 2013/0204888 | A1* | 8/2013 | Guzman Suarez | H04L 51/56 |
| | | | | 707/758 |
| 2017/0185252 | A1 | 6/2017 | Katai et al. | |
| 2017/0286539 | A1* | 10/2017 | Smith | G06F 16/95 |
| 2018/0287982 | A1 | 10/2018 | Draeger et al. | |
| 2019/0253430 | A1 | 8/2019 | Gamache et al. | |
| 2019/0361910 | A1 | 11/2019 | Rogynskyy et al. | |
| 2020/0322347 | A1* | 10/2020 | Goyal | G06Q 10/101 |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield On How Slack Became A $2.8 Billion Unicorn", FORBES, [online] [retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, WIKIPEDIA, [online][retrieved May 30, 2019]. Retrieved from the Internet: <URL: https://en.wikipedia.org/wiki/Internet_Relay_Chat> (dated May 28, 2019) 21 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516> (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", FUJITSU Sci. Tech. J., 36, 2, (Dec. 2000) pp. 154-161.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking Up The Slack", TEDIUM, [online][retrieved May 9, 2019]. Retrieved from the Internet: < URL: https://tedium.co/2017/10/17/irc-vs-slack-chat-history/> (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.
PCT Search Report and Written Opinion dated Mar. 29, 2021 for PCT Application No. PCT/US21/14926, 17 pages.
European Communication Pursuant to Article 94(3) EPC for U.S. Appl. No. 17/156,916, dated Jun. 6, 2023, a foreign counterpart of U.S. Appl. No. 17/156,916, 6 pages.
European Communication Pursuant to Article 94(3) EPC for U.S. Appl. No. 17/156,916, dated Jan. 19, 2023, a foreign counterpart of U.S. Appl. No. 17/156,916, 11 pages.

* cited by examiner

FIG. 5A

✉ INVITE MULTI-CHANNEL GUESTS

New multi-channel will only have access to these chanels channel 1 ✕   #channel 2 ✕   #channel 3 ✕

Email Addresses          First Name          Last Name

Shannon@tinydot.com 🔍      (optional) 🔍           (optional) 🔍

Invite to

+ Add another                                      Big teams to invite? <u>Invite many people at once</u>

Make your invite a little bit more personal by writing <u>a custom message</u>

Invite 1 Multi-Channel Guest

You'll be charged a pro-rated amount for each new member. See our Guide to billing. Note that guest accounts can access your Team Directory. See all pending and accepted invitations.

DYNAMIC PROFILE RECONCILIATION IN GROUP-BASED COMMUNICATION SYSTEMS

PRIORITY

This application is a continuation of and claims priority to U.S. Provisional patent Application No. 62/968,287, filed Jan. 31, 2020, and entitled "Dynamic Profile Reconciliation in Group-Based Communication Systems," the entire contents of which are incorporated herein by reference.

BACKGROUND

Effective and efficient data storage across multiple storage servers is central to storage efficiency of various distributed software applications. Applicant has identified a number of deficiencies and problems associated with storage efficiency of distributed software applications. Through applied effort, ingenuity, and innovation, many of these identified problems have been solved by developing solutions that are included in examples of the present disclosure, many examples of which are described in detail herein.

BRIEF DESCRIPTION OF THE DRAWINGS

The detailed description is described with reference to the accompanying figures, which are not necessarily drawn to scale. In the figures, the left-most digit(s) of a reference number identifies the figure in which the reference number first appears. The use of the same reference numbers in different figures indicates similar or identical components or features.

FIGS. 5A-5B are operational examples of guest invitation user interfaces according to some examples of the present disclosure.

DETAILED DESCRIPTION

Figure 1:
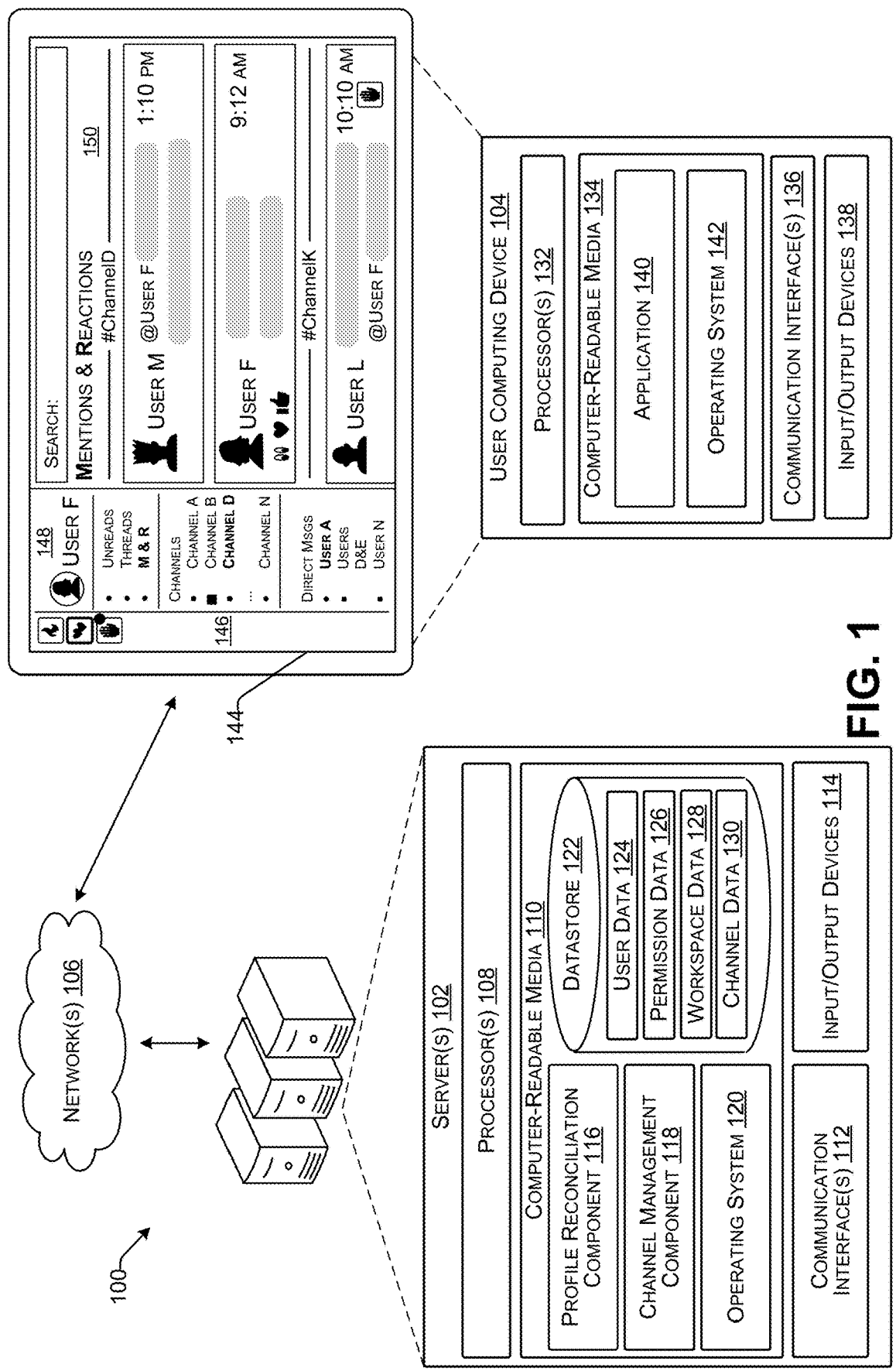
FIG. 1 depicts an example environment for performing techniques of the present disclosure.

Dynamic profile reconciliation in a communication system is described. The communication system can be a group-based communication system, a channel-based messaging platform, and/or any other system for facilitating communication between and among users. In an example, a user of a first organization can utilize communication services available via the communication system to communicate with one or more users of the first organization and/or one or more users of a second organization. In some examples, the user may have associated therewith two or more user profiles. The dynamic profile reconciliation techniques described herein may include one or more computer-implemented processes configured to integrate data associated with the two or more user profiles into a single user profile.

In distributed software applications, user profile data may be stored on more than one storage server, including across multiple storage servers each associated with a separate organizational identifier. Furthermore, because user data is typically stored on databases organized by profile associations, it may be difficult to determine that two different user profiles relate to the same real-world user entity, and thus that a first data object associated with a first user profile and stored on a first storage server is related to a second user profile whose relevant data is stored on a second storage server. The resulting multiplicity of data storage across profile-level categorizations and across distributed storage servers incurs substantial storage costs on distributed software applications. Therefore, various existing distributed software applications face substantial storage complexity challenges because of multiplicity of data storage across profile-level categorizations and across distributed storage servers.

To address the above-noted challenges associated with multiplicity of data storage across profile-level categorizations and across distributed storage servers in distributed software applications, various examples of the present disclosure enable solutions for detecting identity associations between particular user profiles and performing profile reconciliation between the particular user profiles in response to detecting the noted identity associations. By introducing solutions that enable profile reconciliation for user profiles deemed to have an identity association, various examples of the present disclosure enable defining and executing meta-instructions that perform profile reconciliation in a systematic, efficient, effective, and user-friendly manner. In doing so, various examples of the present disclosure reduce storage costs associated with duplicate storage of data items having similar functionalities across various distributed storage servers. Accordingly, various examples of the present disclosure reduce the substantial storage complexity challenges of distributed software applications, improve the storage efficiency of various existing distributed software applications, and make important technical contributions to improving storage efficiency of distributed software applications.

Various examples of the present disclosure will now be described more fully hereinafter with reference to the accompanying drawings, in which some, but not all examples of the disclosure are shown. Indeed, the disclosure may be embodied in many different forms and should not be construed as limited to the examples set forth herein; rather, these examples are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

While examples of the present disclosure relate to dynamic profile reconciliation in a communication system, a person of ordinary skill in the relevant technology will recognize that various techniques described herein may be used to perform dynamic profile reconciliation in various other software applications, such as various other distributed software applications.

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (TOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102.

Functional components stored in the computer-readable media can optionally include a profile reconciliation component 116, a channel management component 118, an operating system 120, and a datastore 122.

In at least one example, the profile reconciliation component 116 can manage profile reconciliation between a source profile (e.g., guest profile, first profile to be integrated into another profile) and a destination profile (e.g., member profile, second profile into which first profile data is integrated) based on a determination that the source profile and the destination profile are associated with a same user of the communication platform. Profile reconciliation may include an integration of data associated with two or more user profiles (e.g., source profile, destination profile, etc.) into a single user profile.

In various examples, the profile reconciliation component 116 can identify an identity association between the source profile and the destination profile. In some examples, the identity association may be identified based on modeling rules. In at least one example, the identity association may include a likelihood that two or more user profiles are associated with the same user entity. The identity association may include a Boolean value that indicates whether an identity association score between two or more user profiles exceeds an identity association threshold.

In some examples, based on the identity association (e.g., determination that a source profile and destination profile are associated with a same entity), the profile reconciliation component 116 can perform one or more profile reconciliation routines with respect to the source profile and the destination profile. Examples of three sets of profile reconciliation routines include cross-profile communication history integration routines, cross-profile personal data integration routines, and cross-profile data integration routines, each of which is described in detail below. However, a person of ordinary skill in the relevant technology will recognize that other profile reconciliation routines (e.g., other cross-profile data integration routines for content data other than communication history streams, personal data objects, and referential data objects) may be performed as part of a profile reconciliation process. For example, in some embodiments, in response to identifying the identity association, the profile reconciliation component 116 can modify a source ownership indicator of content data associated with the source profile to transfer ownership of the content data to the destination profile.

In at least one example, the channel management component 118 can manage communication channels. As described above, in at least one example, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In at least one example, the channel management component 118 can establish a communication channel between and among various user computing devices, allowing the user computing devices to communicate and share data between and among each other.

In at least one example, the channel management component 118 can manage such communications and/or sharing of data The channel management component 118 can transfer messages (e.g., message communications including text, image, video, audio or a combination thereof provided by a user computing device 104, metadata associated with messages including message identifier, message contents, sending user identifier, a group identifier, a communication channel identifier, time stamp, etc.) between users having associated credentials and/or permissions to view the communication channel. In various examples, a communication channel identifier, or a unique identifier associated with a particular communication channel) can be associated with user profiles of the users authorized to interact with content therein. In such examples, the channel management component 118 can identify the users that have the credentials and/or permissions to interact with the content of a communication channel based on data stored in the user profiles.

The channel management component 118 can identify users having the associated credentials and can cause a display of messages associated with each communication channel to authorized users. Data associated with a communication channel can be presented via a user interface. In some examples, data associated with different users can be presented differently on associated user interfaces. For example, a first user interface associated with a guest profile may be presented differently than a second user interface associated with a member profile. In at least one example, the channel management component 118 can interact with the profile reconciliation component 116 to manage the generation, presentation, and/or access to user interfaces including functionalities associated with communication channels based on whether a user is associated with a guest profile or a member profile.

In some examples, the channels managed by the channel management component 118 may be associated with a particular organization. In such examples, the communication channels can be associated with an organizational identifier (e.g., group identifier) and can be available to members of the particular organization and/or guests thereof. The organizational or group identifier may include a unique identifier by which a particular organization or group of users may be identified. Communication channels that are accessible to members of an organization and/or guests of the organization and/or communication channel are referred to herein as non-shared channels.

In some examples, the channels managed by the channel management component 118 may be associated with two or more organizations and/or two or more organizational identifiers. Communication channels that are associated with two or more organizations are referred to herein as shared communication channels. In various examples, the channel management component 118 can be configured to modify a non-shared communication channel into a shared communication channel responsive to receiving a request, such as from an administrator of an organization associated with the non-shared communication channel. In some examples, the shared communication channel may be generated based on receiving an approval thereof from administrators of the prospective associated organizations.

In various examples, the channel management component 118 can manage communication channels associated with one or more workspaces. As described above, each workspace may include one or more communication channels for data transmission among users of the workspace. The workspace may be associated with a particular organization and thus may have associated therewith an organizational identifier. In some examples, a workspace that is associated with an organization may be accessible to members of the organization and to guests of the organization. The guests may be invited to join a particular communication channel and/or one or more communication channels associated with the workspace managed by an organization by an administrator (e.g., user associated with an administrator profile, user with administrative access privileges, etc.) associated with the organization. The administrator can utilize a guest profile invitation user interface, such as guest invitation user interface 500 of FIG. 5A and/or guest invitation user interface 550 of FIG. 5B. In various examples, the guest invitation user interface can enable an administrator of a target group-based communication channel and/or workspace to create one or more guest profiles and define guest access criteria (e.g., access duration, access channel associations, read/write permissions, file transfer permissions, etc.) for each guest profile (e.g., guest user profile).

In various examples, responsive to creation of the guest user profile, the channel management component 118 can generate user interfaces based on the access privileges. For example, a first guest may be granted access to a first communication channel in a workspace, but not a second communication channel in the workspace. The channel management component 118 can generate a user interface associated with the guest user profile, the user interface comprising a selectable option to view contents associated with the first communication channel but not the second communication channel. In some examples, the access privileges may include limitations on interactions with the content transmitted via the communication channel to which the guest has been granted access. For example, the guest profile may include file transfer limitations, permitting the guest to draft and transfer messages via the communication channel, but not attach files thereto.

In some examples, the workspaces managed by the channel management component 118 may be associated with two or more organizations and/or two or more organizational identifiers. Workspaces that are associated with two or more organizations are referred to herein as shared communication workspaces or shared workspaces. In various examples, the channel management component 118 can be configured to modify a communication channel and/or a workspace that is associated with a single organization into a shared communication channel and/or workspace responsive to receiving a request (e.g., shared communication channel generation request, shared communication workspace generation request), such as from an administrator of the organization. In some examples, the shared communication channel may be generated based on receiving an approval thereof from administrators of the prospective associated organizations.

In some examples, when a shared communication channel and/or communication workspace is determined by performing a transition of a non-shared communication channel and/or communication workspace into having a shared state, the non-shared communication channel and/or communication workspace may be referred to as the initiator communication channel and/or communication workspace for the shared group-based communication workspace. In such examples, an organizational identifier associated with the initiator communication channel and/or communication workspace may be referred to herein as the primary organizational identifier. An identifier associated with an organization that is added to the shared communication channel and/or communication workspace (e.g., not the initiator) may be referred to herein as a secondary organizational identifier.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise multiple databases, which can include user data 124, permission data 126, workspace data 128, and channel data 130. Additional or alternative data may be stored in the data store and/or one or more other data stores.

In at least one example, the user data 124 can store data associated with users of the communication platform. In at least one example, the user data 124 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like. In some examples, the user data 124 may include one or more guest profiles generated responsive to a request submitted by an administrator of an organization.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, an account or profile associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permissions data 126 may include whether a particular user profile is associated with full access privilege (e.g., member access privilege) or limited access privilege (e.g., guest access privilege). As used herein, limited access privilege may include limited access to functionalities associated with the communication platform. For example, a user profile having limited access privilege may be denied the privilege to request to join other communication channels and/or workspaces, to invite other members to join communication channels and/or workspaces, and the like. In various examples, a user profile having limited access privileges may submit an access privilege request to obtain full access privilege with respect to one or more communication channels and/or workspaces. An access privilege request can be submitted by an individual user associated with a guest (or limited access) profile or by an administrator of an associated communication channel and/or workspace.

In some examples, responsive to receiving the access privilege request, the communication platform may update permissions data 126 associated with the user profile to include full access privilege with respect to the particular communication channel and/or workspace indicated in the request. As used herein, full access privilege may include privilege to access available non-administrative functionalities associated with the communication platform, such as based on a particular user account. For example, a user profile having full access privilege can include requesting to join additional communication channels and/or workspaces, inviting other members to join communication channels and/or workspaces, and the like.

In at least one example, the workspace data 128 can store data associated with individual workspaces. As described above, the communication platform can be partitioned into workspaces associated with groups of users. In at least one example, a group identifier can be associated with a workspace. In at least one example, the group identifier can indicate a physical address in the workspace data 128 where data related to the corresponding workspace is stored. In at least one example, data associated with workspace permissions can be stored in association with the group identifier, data identifying users associated with the workspace can be stored in association with the group identifier, data associated with messages and/or other content associated with the workspace can be stored in association with the group identifier, data associated with communication channels associated with the workspace can be stored in association with the group identifier, and the like. In some examples, workspaces can be associated with one or more organization identifiers, which can be associated with organizations or other entities associated with the communication platform. In some examples, such data can be mapped to, or otherwise associated with, other types of data in the datastore 122 (e.g., the user data 124, the permission data 126, the channel data 130, etc.).

In at least one example, the channel data 130 can store data associated with individual communication channels. In at least one example, the channel management component 118 can establish a communication channel between and among various user computing devices, allowing the user computing devices to communicate and share data between and among each other. In at least one example, a communication channel identification may be assigned to a communication channel, which indicates the physical address in the channel data 130 where data related to that communication channel is stored. A communication channel may be "public," which may allow any user within an organization (e.g., associated with an organization identifier) to join and participate in the data sharing through the communication channel, or a communication channel may be "private," which may restrict data communications in the communication channel to certain users or users having particular roles (e.g., managers, administrators, etc.). In some examples, a communication channel may be "shared," which may allow users associated with different organizations (e.g., entities associated with different organization identifiers) to join and participate in the data sharing through the communication channel. Shared channels may be public such that they are accessible to any user of either organization, or they may be private such that they are restricted to access by certain users or users having particular roles from both organizations.

Channel data 130 associated with a primary organizational identifier can be stored on a primary storage platform configured to store communication data (e.g., messages, files, etc.) associated with one or more communication channels and/or workspaces corresponding to the primary organizational identifier. Channel data 130 associate with a secondary organizational identifier can be stored on a secondary storage platform configured to store communication data associate with one or more communication channels and/or workspaces corresponding to the secondary organizational identifier. The primary and/or secondary storage platforms can include one or more storage units, such as multiple distributed storage units that are connected through a computer network. Each storage unit in the primary storage platform may store at least one of one or more data assets and/or one or more data about the computed properties of one or more data assets. Moreover, each storage unit in the primary storage platform may include one or more nonvolatile storage or memory media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 122 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In some examples, individual groups can be associated with a database shard within the datastore 122 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a communication channel can be associated with a database shard within the datastore 122 that stores data related to a particular channel identification. For example, a database shard may store electronic communication data associated with the communication channel, which enables members of that particular communication channel to communicate and exchange data with other members of the same communication channel in real time or near-real time. In this example, a group or organization can be the owner of the database shard and can control where and how the related data is stored.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web sockets, Application Programming Interfaces (APIs) (e.g., using API calls), HypterText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input.

A non-limiting example of a user interface 144 is shown in FIG. 1. As illustrated in FIG. 1, the user interface 144 can present data associated with one or more communication channels and, in some examples, one or more workspaces. That is, in some examples, the user interface can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 144 can include a first region 146, or pane, that includes indicator(s) (e.g., user interface element(s) or object(s)) associated with workspace(s) with which the user (e.g., account of the user) is associated. In some examples, the user interface 144 can include a second region 148, or pane, that includes indicator(s) (e.g., user interface element(s) or object(s)) representing data associated with the workspace(s) with which the user (e.g., account of the user) is associated. Additional details associated with the second region 148 and indicator(s) are described below with reference to FIG. 2.

In at least one example, the user interface 144 can include a third region 150, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 150 can be associated with the same or different workspaces. That is, in some examples, the third region 150 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 150 presents data associated with multiple workspaces, at least some data can be associated with an indication of which workspace the data is associated with. Additional details associated with the user interface 144, and the third region 150, are described below with reference to FIG. 2.

In at least one example, the operating system 142 can manage the processor(s) 132, computer-readable media 134, hardware, software, etc. of the server(s) 102.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, connection ports and so forth.

While techniques described herein are described as being performed by the profile reconciliation component 116, the channel management component 118, and the application 140, techniques described herein can be performed by any other component, or combination of components, which can be associated with the server(s) 102, the user computing device 104, or a combination thereof.

Figure 2:
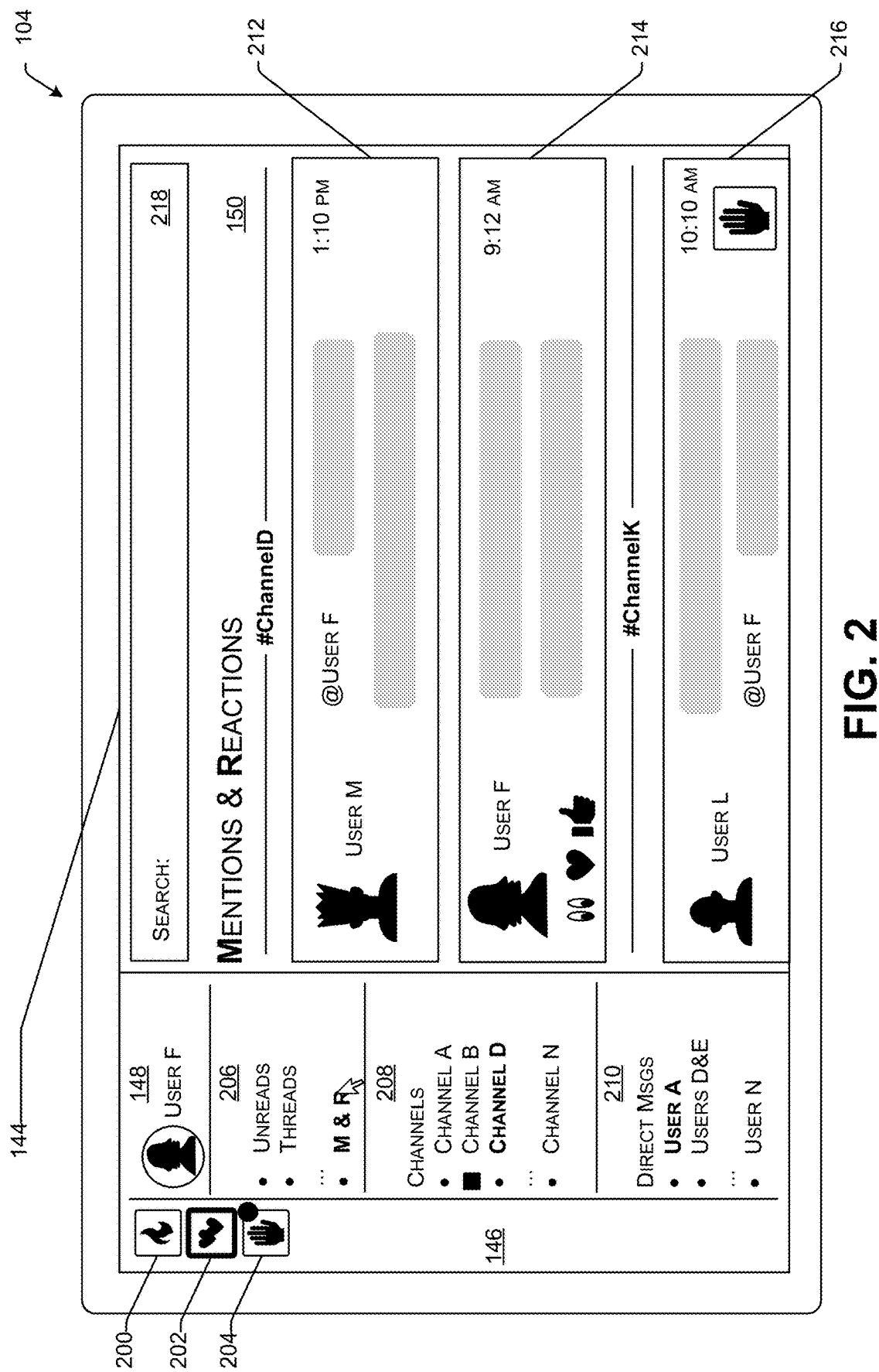
FIG. 2 illustrates additional details associated with a user interface of a communication platform that presents data associated with multiple communication channels, as described above with reference to FIG. 1.

FIG. 2 illustrates additional details associated with the user interface 144 that presents data associated with a user profile that includes full access privileges, as described above with reference to FIG. 1.

As described above, in at least one example, the user interface 144 can include a first region 146, or pane, that includes indicator(s) (e.g., user interface element(s) or object(s)) of workspace(s) with which the user (e.g., account of the user) is associated. As illustrated in FIG. 2, the user (e.g., User F) can be associated with three different workspaces. In some examples, the workspaces can be associated with a same organization (e.g., associated with a same organization identifier, non-shared communication workspace). In some examples, one or more of the workspaces can be associated with different organizations (e.g., associated with different organization identifiers, shared communication workspaces). In some examples, one of the workspaces can be associated with users from a single organization (e.g., associated with a same organization identifier) and another of the workspaces can be associated with users from two or more different organizations (e.g., associated with different organization identifiers).

In at least one example, each workspace can be associated with a different indicator 200-204, presented via the first region 146. In at least one example, a user account of the user (e.g., User F) can be associated with group identifiers that correspond to each of the workspaces (e.g., as determined by the user data 124 and/or the workspace data 128). As such, the user account of the user can be associated with each of the workspaces. A first indicator 200 can represent a first workspace, a second indicator 202 can represent a second workspace, and a third indicator 204 can represent a third workspace.

In some examples, the user can navigate between the workspaces by actuating a control associated with each of the indicators 200-204 without needing to log out of one workspace and log in to each of the other workspaces. Non-limiting examples of such indicators, or any indictors described herein, can include icons, symbols, links, tabs, or other user interface elements or objects. In some examples, such indicators can be associated with actuation mechanisms to enable a user to select an indicator and transition to another workspace. In some examples, a visual indicator can indicate which workspace a user is currently interacting with and/or most recently interacted with. For example, the second indicator 202 is outlined in a heavier weight than the first indicator 200 and the third indicator 204, thereby indicating which workspace the user is currently interacting with and/or most recently interacted with. In some examples, the indicators 200-204 can be associated with another indicator indicating that the corresponding workspace has been updated. An example is shown with respect to the third indicator 204.

While three indicators 200-204 are illustrated in FIG. 2, the user can be associated with any number of workspaces. In some examples, indicators associated with all of the workspaces with which a user is associated can be presented via the first region 146. In some examples, some of the indicators associated with all of the workspaces with which a user is associated can be presented via the first region 146 and the user can interact with the user interface 144 to view additional or alternative indicators. In examples where fewer than all workspaces are represented via the user interface 144, the indicators can be arranged in alphabetical order, in an order of most recent interaction, in an order based on most frequent interaction, or some other order.

In some examples, the first region 146 may not be included in the user interface 144, and such information can be integrated into the user interface 144 via additional or alternative mechanisms.

In some examples, the user interface 144 can include a second region 148, or pane, that includes indicator(s) (e.g., user interface element(s) or object(s)) representing virtual space(s) associated with the workspace(s) with which the user (e.g., account of the user) is associated. In at least one example, the second region 148 can include one or more sub-sections, or sub-panes, which can represent different virtual spaces. For example, a first sub-section 206 can include indicators representing virtual spaces that can aggregate data associated with a plurality of communication channels and/or workspaces. In at least one example, each virtual space can be associated with an indicator in the first sub-section 206. In some examples, an indicator can be associated with an actuation mechanism such that when actuated, can cause the application 140 to present data associated with the corresponding virtual space via the third region 150. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the third region 150, for example in a feed. In such examples, different types of events and/or actions, which can be associated with different communication channels and/or virtual spaces, can be presented via a same feed. In some examples, such data can be organized and/or is sortable by workspace, time, type of action, communication channel, user, or the like. In some examples, such data can be associated with an indication of which user (e.g., member of the communication channel) posted the message and/or performed an action.

In some examples, each virtual space can be associated with a same type of event and/or action. For example, "threads" can be associated with messages, files, etc. posted in threads to messages posted in a communication channel and "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. That is, in some examples, same types of events and/or actions, which can be associated with different communication channels and/or virtual spaces, can be presented via a same feed. As with the "unreads" virtual space, data associated with such virtual spaces can be organized and/or is sortable by workspace, time, type of action, communication channel, user, or the like.

In at least one example, the second region 148 of the user interface 144 can include a second sub-section 208, or sub-pane, that includes indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the second sub-section 208 can depict all communication channels, or a subset of all communication channels, that the user has permission to access (e.g., as determined by the permission data 126). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the second sub-section 208 can depict all communication channels, or a subset of all communication channels, that the user is a member of, and the user can interact with the user interface 144 to browse or view other communication channels that the user is not a member of but are not currently displayed in the second sub-section 208. In some examples, different types of communication channels (e.g., public, private, shared, cross-workspace, etc.) can be in different sections of the second sub-section 208, or can have their own sub-regions or sub-panes in the user interface 144. In some examples, communication channels associated with different workspaces can be in different sections of the second sub-section 208, or can have their own regions or panes in the user interface 144.

In some examples, the indicators can be associated with graphical elements that visually differentiate types of communication channels. For example, Channel B is associated with a square visual element instead of a circle visual element. As a non-limiting example, and for the purpose of this discussion, the square visual element can indicate that the user is not a current member of Channel B, whereas the circle visual element can indicate that the user is a current member of Channels A, D, and N. In some examples, additional or alternative graphical elements can be used to differentiate between public communication channels, private communication channels, shared communication channels, communication channels associated with different workspaces, and the like. In other examples, communication channels that the user is not a current member of may not be displayed in the second sub-section 208 of the user interface 144. In such examples, the user may navigate to a different interface (not shown) to browse additional channels that are accessible to the user but to which the user is not currently a member.

In addition to the second sub-section 208, the second region 148 can include a third sub-section 210, or sub-pane, that can include indicators representative of communications with individual users or multiple specified users (e.g., instead of all, or a subset of, members of an organization). Such communications can be referred to as "direct messages." That is, the third sub-section 210, or sub-pane, can include indicators representative of virtual spaces that are associated with private messages between two or more users.

As described above, in at least one example, the user interface 144 can include a third region 150, or pane, that is associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the third region 150 can be associated with the same or different workspaces. That is, in some examples, the third region 150 can present data associated with the same or different workspaces via an integrated feed. In some examples, the data can be organized and/or is sortable by workspace, time, type of action, communication channel, user, or the like. In some examples, such data can be associated with an indication of which user posted the message and/or performed an action. In examples where the third region 150 presents data associated with multiple workspaces, at least some data can be associated with an indication of which workspace the data is associated with.

For example, in FIG. 2, the user (e.g., User F), can interact with the user interface 144 to view data associated with the virtual space corresponding to "mentions and reactions." In FIG. 2, data associated with the virtual space can be associated with different communication channels and different workspaces. As illustrated, the data is organized by communication channel (e.g., #ChannelD and #ChannelK). However, as described above, the data can be organized and/or sortable by workspace, time, type of action, user, or the like. As illustrated, another user (e.g., User M) mentioned the user (e.g., User F) in a message, represented by the indicator 212 (e.g., a user interface element, object, etc.), which is associated with a communication channel (e.g., #ChannelD). The user (e.g., User F) also posted a message, represented by the indicator 214 (e.g., a user interface element, object, etc.), in the same communication channel. One or more other users reacted to the message, represented by the indicator 214, with an emoji. As such, indicators associated with both messages can be presented in the third region 150. Because the data is organized by communication channel, indicators associated with both messages are presented together. In at least one example, the communication channel (e.g., #ChannelD) can be associated with the second workspace (e.g., associated with the second indicator 202). In some examples, because the user is currently interacting with (or most recently interacted with) the second workspace, neither of the indicators 212 or 214 are associated with workspace indicators (e.g., the second indicator 202).

As illustrated, another user (e.g., User L) mentioned the user (e.g., User F) in a message, represented by the indicator 216 (e.g., a user interface element or object), which is associated with a communication channel (e.g., #ChannelK). As such, the indicator 216 can be presented in the third region 150. Because the data is organized by communication channel, the indicator 216 can be presented in a different position in the feed than the other indicators 212 and 214. In at least one example, the communication channel (e.g., #ChannelK) can be associated with the third workspace (e.g., associated with the third indicator 204). In some examples, because the user is currently interacting with (or most recently interacted with) the second workspace, the indicator 216 may include an indicator indicating that it is associated with the third workspace (e.g., the third indicator 204).

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

In some examples, a user can comment on a message in a "thread." A thread can be a message associated with another message that is not posted to a communication channel, but instead is maintained within an object associated with the original message. Messages and/or threads can be associated with file(s), emoji(s), app(s), etc.

A communication channel or other virtual space can be associated with data and/or content other than messages, or data and/or content that is associated with messages. For example, non-limiting examples of additional data that can be presented via the third region 150 of the user interface 144 include members added to and/or removed from the communication channel, file(s) (e.g., file attachment(s)) uploaded and/or removed from the communication channel, application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

In some examples, the third region 150 can comprise a feed associated with a single communication channel. In such examples, data associated with the communication channel can be presented via the feed. In at least one example, data associated with a communication channel can be viewable to at least some of the users of a group of users associated with a same group identifier. In some examples, for members of a communication channel, the content of the communication channel (e.g., messaging communications) can be displayed to each member of the communication channel. For instance, a common set of group-based messaging communications can be displayed to each member of the communication channel such that the content of the communication channel (e.g., messaging communications) may not vary per member of the communication channel. In some examples, data associated with a communication channel can appear differently for different users (e.g., based on personal configurations, group membership, etc.).

In at least one example, the format of the individual communication channels or virtual spaces may appear differently to different users. In some examples, the format of the individual communication channels or virtual spaces may appear differently based on which workspace a user is currently interacting with or most recently interacted with. In some examples, the format of the individual communication channels or virtual spaces may appear differently for different users (e.g., based on personal configurations, group membership, etc.).

In at least one example, the user interface 144 can include a search mechanism 218, wherein a user can input a search term and the server(s) 102 can perform a search associated with the communication platform. In some examples, the search can be performed across each workspace with which the user is associated, or the search can be restricted to a particular workspace, based on a user specification.

The user interface 144 is a non-limiting example of a user interface that can be presented via the user computing device 104 (e.g., by the application 140). In some examples, the application 140 can receive data from the profile reconciliation component 116 and/or channel management component 118 and the application 140 can generate and present the user interface 144 based on the data. In other examples, the application 140 can receive data from the channel management component 118 and instructions for generating the user interface 144 from the profile reconciliation component 116 and/or channel management component 118. In such an example, the application 140 can present the user interface 144 based on the instructions. Additional or alternative data can be presented via a user interface and additional or alternative configurations can be imagined.

Figure 3:
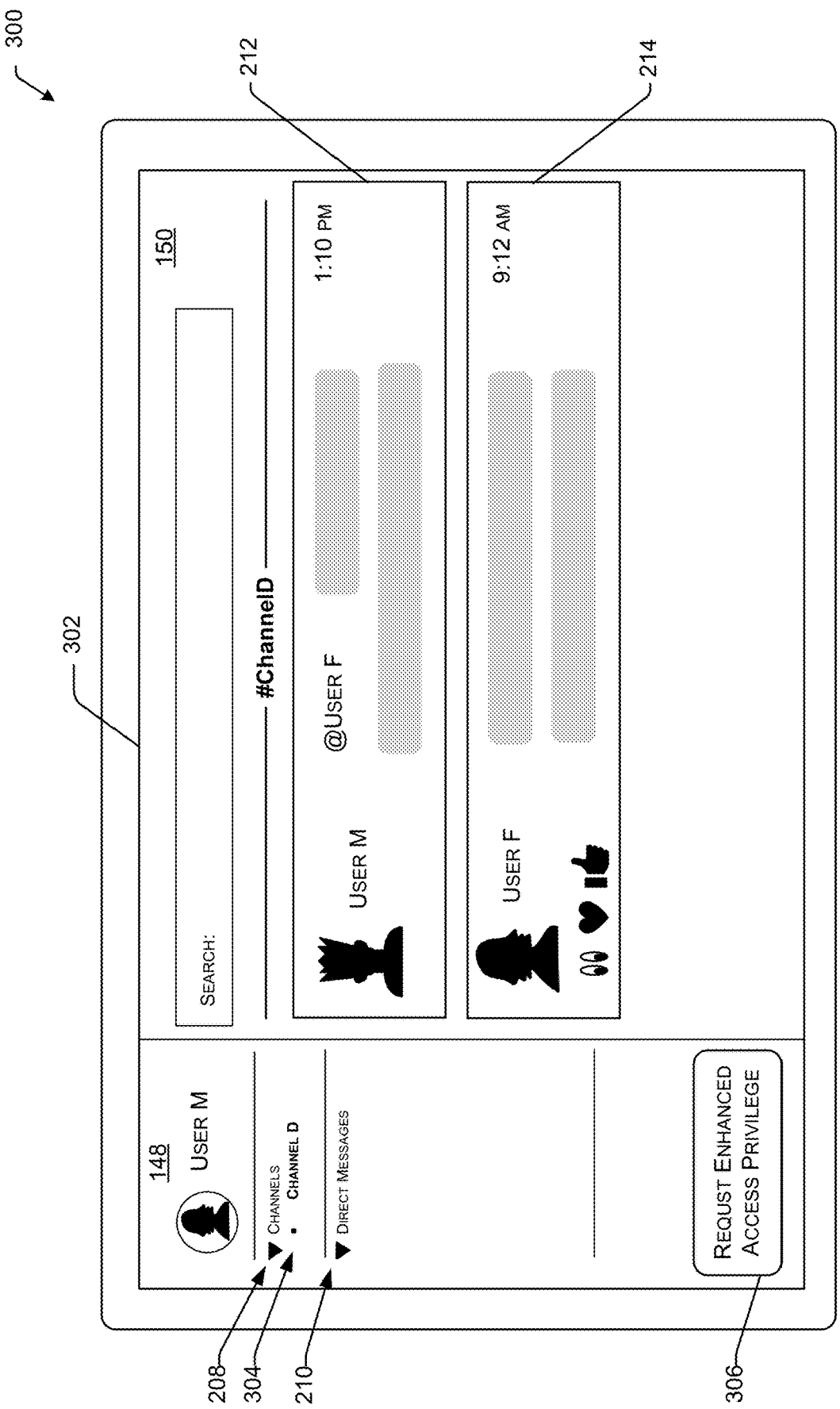
FIG. 3 depicts an example user interface associated with a guest profile according to some examples of the present disclosure.

FIG. 3 illustrates an example user computing device 300, such as user computing device 104, presenting an example user interface 302 of a communication platform corresponding to a guest profile that includes limited access privileges, as described above with reference to FIG. 1.

In various examples, the communication platform may generate the user interface 302 in response to receiving, from an administrator of an organization, a request to generate a guest profile associated with a particular communication channel and/or workspace. As discussed above and below, the administrator may submit the request via a guest profile invitation user interface, such as guest profile invitation user interface 500 of FIG. 5A and/or 550 of FIG. 5B. In various examples, the administrator can designate permissions to be associated with the guest profile and/or the user interface 302. In such examples, the communication platform can generate the user interface 302 based on the permissions.

In the illustrative example, the user ("User M") may be associated with a guest profile in which the User may interact with data associated with a single channel ("Channel D"). Though this is not intended to be so limiting, and the guest profile may be associated with one or more channels, one or more workspaces, one or more direct messaging instances, or the like.

In various examples, the user interface 302 may include a second region 148 with a second sub-section 208, or sub-pane, that includes indicators representing one or more communication channels to which the user has access and/or permissions to view. In some examples, the second sub-section 208 may include one or more communication channels associated with a workspace to which the user is associated, at least in part. For example, the guest profile associated with user interface 302 may have associated therewith permissions to interact with data corresponding to a first communication channel 304 ("Channel D"). In some examples, the second sub-section 208 may include an indicator providing a visual indication that the user has permission to interact with content associated with at least one communication channel of the one or more communication channels.

In addition to the second sub-section 208, the second region 148 can include a third sub-section 210, or sub-pane, that can include indicators representative of communications with individual users or multiple specified users (e.g., instead of all, or a subset of, members of an organization). Such communications can be referred to as "direct messages." That is, the third sub-section 210, or sub-pane, can include indicators representative of virtual spaces that are associated with private messages between one or more users.

In at least one example, the user interface 302 can include a third region 150, or pane, that is associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the third region 150 can be associated with the same or different communication channels and/or workspaces, based on permissions associated with the guest profile of the user. For example, the guest profile associated with user interface 302 may include indicators 212 and 214 representative of messages transmitted via the first communication channel 304, but may not include indicator 216 associated with another communication channel 208 (e.g., Channel K illustrated in FIG. 2) to which the guest profile does not have permissions to access.

In various examples, the user interface 302 may include an access privilege selectable control 306 via which the user may submit an access privilege request, as described above. In various examples, responsive to receiving a selection of the access privilege selectable control 306, the communication platform may upgrade access privilege configuration settings associated with the guest profile. In alternative examples, the access privilege request may be submitted by an administrator of an organization to which the guest profile is associated.

Various examples of the present disclosure generally relate to a method, apparatus, and system for performing dynamic profile reconciliation in a communication system, such as communication system 100. Profile reconciliation may include one or more computer-implemented processes configured to integrate data associated with two or more user profiles (e.g., a source profile and a destination profile), where the two or more user profiles are determined to be associated with the same user entity. Examples of profile reconciliation routines include cross-profile communication history integration routines, cross-profile personal data integration routines, and cross-profile data integration routines.

A cross-profile communication history integration routine may include one or more computer-implemented processes configured to integrate two communication history streams associated with two or more user profiles (e.g., a source communication history stream associated with a source profile and a corresponding destination communication history stream associated with a destination profile). A communication history stream may include information about a set of communications between one or more participating recipient profiles. For example, a communication history stream may include information about a private message thread for private communications of a first user profile with another user profile. For another example, a communication history stream may include information about a group message thread for group communications of a first user profile with user profiles in a particular user profile group. For yet another example, a communication history stream may include information about a group of messages associated with a communication channel (e.g., group-based communication channel), where the communication channel is associated with a first user profile.

As described above, the cross-profile communication history integration may integrate a source communication history stream associated with a source profile into a corresponding destination communication history stream associated with a destination profile. For example, a cross-profile communication history integration may be configured to merge a source communication history stream associated with a source profile and a corresponding destination communication history stream associated with a destination profile in order to generate an integrated communication history stream for the source profile and the destination profile.

The cross-profile personal data integration routines may include one or more computer-implemented processes configured to integrate sets of personal data objects associated with two or more user profiles (e.g., a source communication history stream associated with a source profile and a corresponding destination communication history stream associated with a destination profile). For example, a cross-profile data integration may be configured to integrate personal data objects of a source profile into personal data objects of a destination profile. For another example, a cross-profile data integration may be configured to merge personal data objects of a source profile with personal data objects of a destination profile in order to generate integrated personal data objects for the source profile and the destination profile.

A cross-profile referential data integration may include one or more computer-implemented processes configured to integrate sets of referential data objects (e.g., message and/or other communication in which a particular user is mentioned or otherwise referred to, such as by an @mention) associated with two or more user profiles (e.g., a source communication history stream associated with a source profile and a corresponding destination communication history stream associated with a destination profile). For example, a cross-profile data integration may be configured to integrate referential data objects of a source profile into referential data objects of a destination profile. For another example, a cross-profile data integration may be configured to merge referential data objects of a source profile with referential data objects of a destination profile in order to generate integrated referential data objects for the source profile and the destination profile. In some examples, cross-profile referential data integration includes modifying referential data objects associated with a first user profile (e.g., referring to the first user profile) so that the referential data objects are instead associated with a second user profile (e.g., refer to a second user profile).

While the techniques described herein are described with regard to a communication system (e.g., communication platform), a person of ordinary skill in the relevant technology will recognize that various techniques described herein may be used to perform dynamic profile reconciliation in various other software applications, such as various distributed communication software applications.

Figure 4:
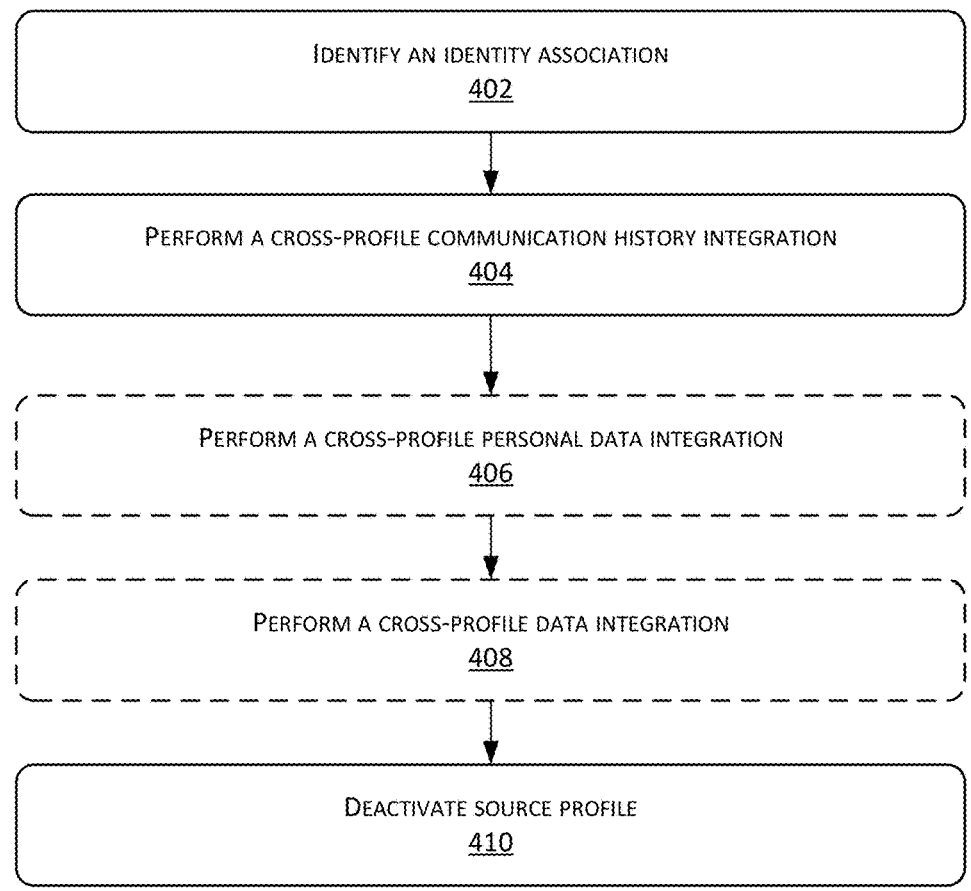
FIG. 4 is a flowchart diagram of an example process for performing dynamic profile reconciliation in a group-based communication system according to some examples of the present disclosure.

FIG. 4 is a flowchart diagram of an example process 400 for performing profile reconciliation in a communication server. Via the various operations of process 400, the communication platform may efficiently perform cross-profile data integration in order to consolidate data resources across profile-level categorizations, thus reducing storage complexity of communication systems. At least by reducing the storage complexity, the techniques described herein may increase an amount of storage available in association with the communication platform, thereby improving a computing device associated therewith.

The process 400 begins at operation 402 when the communication platform identifies an identity association between a source profile and a destination profile, where the source profile and the destination profile are associated with a same user in a target communication channel and/or workspace of the communication platform. An identity association may include a likelihood that two or more user profiles (e.g., source profile and the destination profile) are associated with the same user. In some examples, the identity association may include a Boolean value that indicates whether an identity association score between two or more user profiles exceeds an identity association threshold. In some examples, the identity association score between two or more user profiles is determined based on one or more identity association modeling rules for determining the likelihood that the two or more user profiles are associated with the same user entity. The source profile may include a user profile including corresponding data that is integrated into another profile (i.e., a destination profile) in order to perform profile reconciliation in a communication platform. In some examples, the source profile has a limited access privilege (e.g., a guest access privilege) with respect to one or more communication channels that are associated with the source profile. The limited access privilege may include a denial of the associated user profile to at least one administrative privilege with respect to a corresponding communication channel. For example, a user profile having a limited access privilege may include a guest user profile that is denied the privilege to request access to a communication channel of a corresponding communication platform other than the communication channels currently associated with the guest user profile at a particular time. For another example, a user profile having a limited access privilege may be a guest user profile that is denied the privilege to add new members to communication channels associated with the guest user profile. In some examples, the source profile may have limited access privilege with respect to a workspace of the communication platform. For example, the source profile may have access to a first communication channel associated with the workspace, but may be denied access to a second communication channel associated with the workspace.

A destination profile may include a user profile including data associated with another profile (i.e., a source profile) that is integrated into the destination profile data in order to perform profile reconciliation in the communication platform. In some examples, the destination profile has a full access privilege (e.g., a member-level access privilege, member access privilege, etc.) with respect to any communication channels that are associated with the source profile. The full access privilege may be associated with a user profile that is granted access to each available non-administrative access privileges with respect to a corresponding communication channels. For example, a user profile having full access privilege may be a member user profile having the privilege to request access to any communication channels of a corresponding communication platform other than the communication channels currently associated with the member user profile at a particular time. For another example, a user profile having full access privilege may be a member user profile having privilege to add new members to any communication channels associated with the member user profile.

As discussed above, a communication channel may include a group of users and/or a set of communication objects associated with a common group identifier. In some examples, at least a portion of the communication objects may require that a group member have specific credentials or adequate permissions before the communication object becomes accessible to the group member. A target communication channel may include a group of user profiles, where at least one of the user profiles is expected to be reconciled with one or more other user profiles. In some examples, the target communication channel is a communication channel that is expected to be converted into a shared communication channel using one or more profile reconciliations.

The shared communication channel may include a communication channel that is organizationally associated with two or more organizational identifiers, where association between the communication channel and a particular organizational identifiers enables communication profiles that are associated with the organizational identifier to have full access privileges with respect to the communication channel. In some examples, when a shared communication channel is determined by performing a transition of a non-shared communication channel into having a shared state, the non-shared communication channel may be referred to as the initiator communication channel for the shared communication workspace. In various examples, the shared communication channel may enable user profiles associated with at least two organizational identifiers to access the communication channel as member profiles.

In some examples, to identify the identity association between the source profile and the destination profile, the communication platform determines that a determined likelihood that the source profile and the destination profile are associated with the same user exceeds an identity association threshold. In some examples, to compute the determined likelihood that the source profile and the destination profile are associated with the same user, the communication platform utilizes one or more identity association modeling rules for determining the likelihood that two or more user profiles (e.g., the source profile and the destination profile) are associated with the same user.

In some examples, the source profile has a limited access privilege with respect to the target communication channel, e.g., is a guest user profile in the target communication channel. In some examples, the destination profile has full access privilege with respect to the target communication channel, e.g., is a member of the target communication channel. In some examples, determining the identity association includes determining that a guest user profile of a target communication channel is associated with the same user as a member user profile of another communication platform. In some examples, identifying the identity association is performed in response to receiving an access privilege request for the source profile. The access privilege request may include a request by a user profile having limited access privilege with respect to one or more communication channels of a communication platform to obtain full access privilege with respect to the one or more communication channels. For example, the access privilege request may be generated in response to an action by a corresponding user profile to upgrade the access privilege configuration settings associated with the noted corresponding user profile. For another example, the access privilege may be generated in response to an action by a corresponding user profile that seeks an access privilege not currently granted to the corresponding user profile given the limited access privilege of the noted corresponding user profile, such as by selecting an access privilege selectable control 306. For yet another example, the access privilege may be generated in response to an action by an administrator user profile of a corresponding communication channel.

In some examples, identifying the identity association is performed in response to receiving a shared communication channel generation request to convert an initiator communication channel to the target communication channel. The shared communication channel generation request includes a request to convert an initiator communication channel that is not a shared communication workspace into a shared communication channel. In some examples, the shared communication channel generation request for a particular initiator communication channel may be generated by an administrator user profile of the corresponding initiator communication channel. In some examples, the shared communication channel generation request for a particular initiator communication channel can be generated by a non-administrator user profile of the corresponding initiator communication channel. Additionally or alternatively, the communication platform may convert a non-shared workspace into a shared workspace based on receiving a request (e.g., shared communication workspace generation request), such as from an administrator.

In some examples, a shared communication channel generation request may be generated in response to a request (e.g., an administrator request) to convert a non-shared communication channel into a shared communication channel. In some examples, the initiator communication channel is associated with a primary organizational identifier, and the target communication channel is associated with the primary organizational identifier and a secondary organizational identifier. In some examples, initiator content data associated with the initiator communication channel are stored on a primary storage platform associated with the primary organizational profile, and target content data associated with the target communication workspace are stored both on the primary storage platform associated with the primary organizational identifier and a secondary storage platform associated with the secondary organizational identifier.

In some examples, a guest user profile is created based on one or more actions by an administrator user profile of the target communication channel and/or workspace. In some examples, to create a guest user profile, an administrator user profile utilizes a guest profile invitation user interface, such as the guest invitation user interface 500 of FIG. 5A and the guest invitation user interface 550 of FIG. 5B. As depicted in FIGS. 5A and 5B, the guest invitation user interface 500 and the guest invitation user interface 550 enable an administrator user profile of a corresponding target communication workspace to create one or more guest user profiles and define guest access criteria (e.g., guest access duration, guest access channel associations, etc.) for each group of one or more defined guest user profiles.

Figure 6:
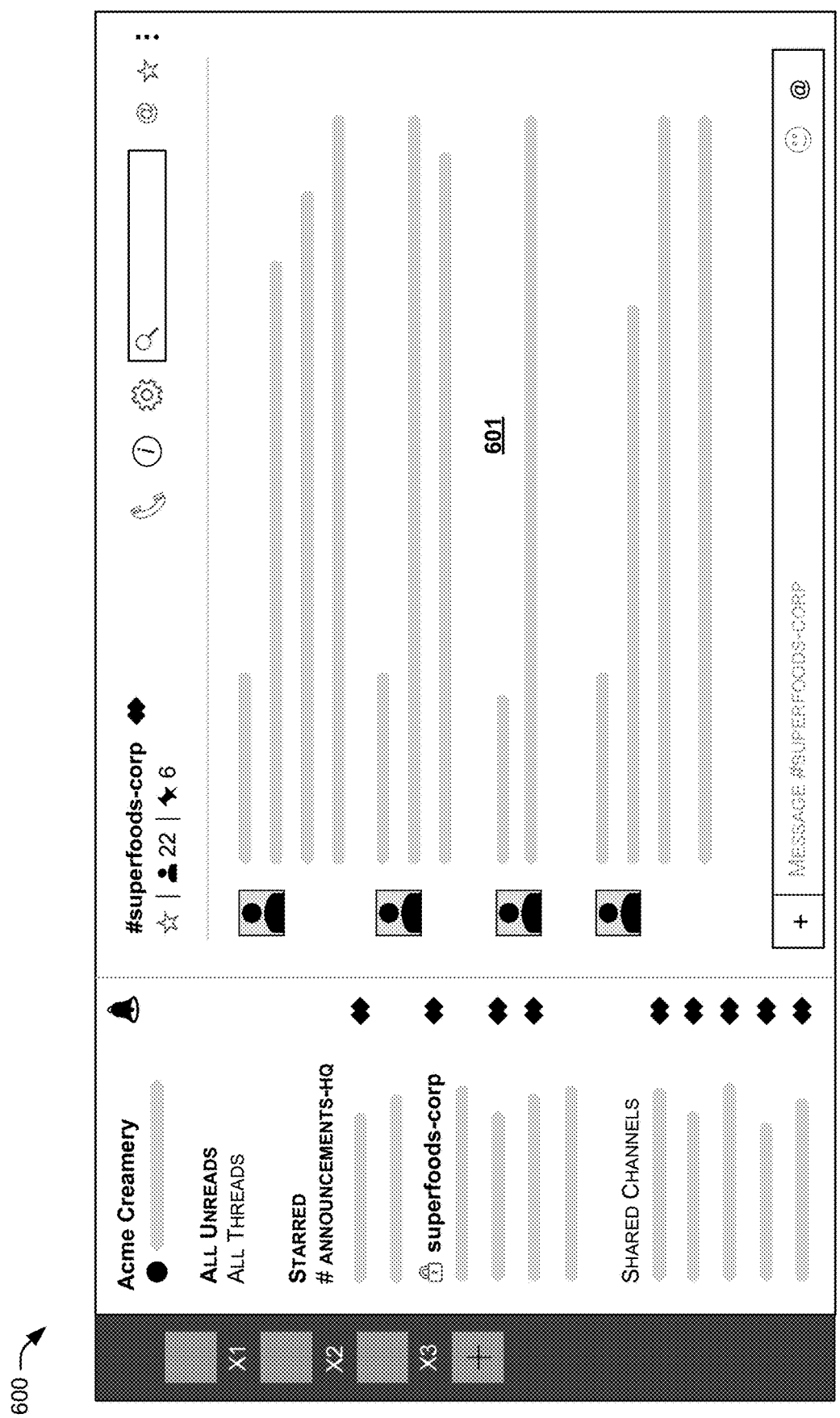
FIG. 6 is an operational example of a group-based communication workspace interface according to some examples of the present disclosure.
Figure 7:
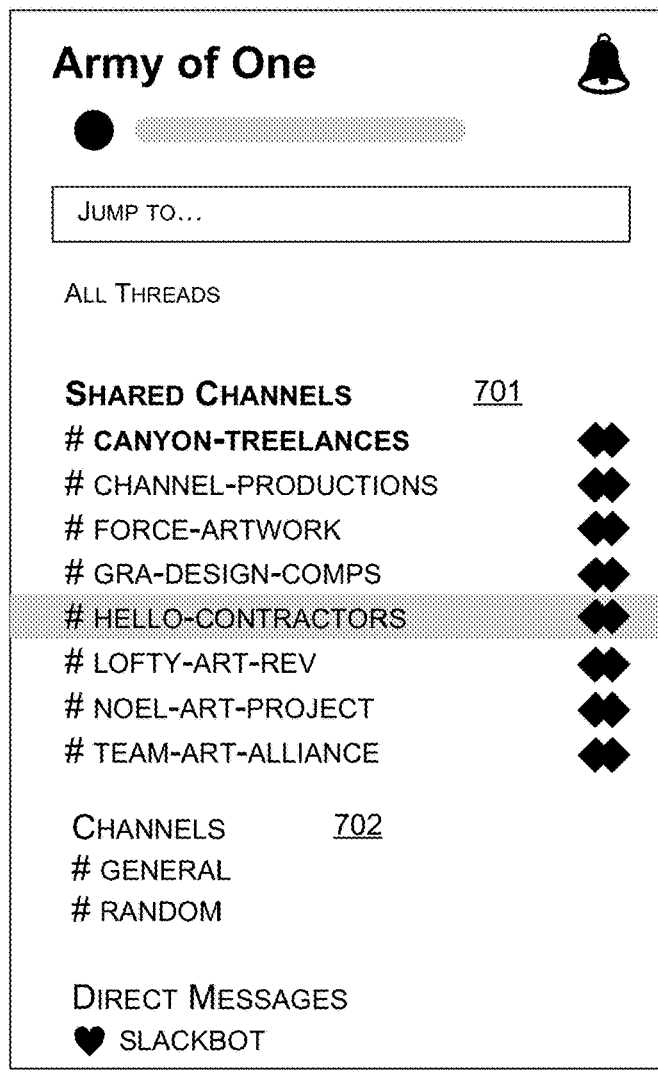
FIG. 7 is an operational example of a guest profile sidebar user interface according to some examples of the present disclosure.

Once granted guest-level permission, a guest user profile may be introduced to other user profiles who are associated with communication channels in which the guest user profile has guest-level access privileges as a guest user profile, e.g., using a relationship initiation user interface element, such as the relationship initiation user interface element 601 in the exemplary communication workspace interface 600 of FIG. 6. In some examples, a guest user profile may be granted access to a predefined list of communication channels within a target communication workspace (e.g., the shared channels indicated by the shared channel list user interface element 701 of the guest profile sidebar user interface 700 of FIG. 7) and may be denied the right to request access to any communication channels outside the noted predefined list of communication channels (e.g., non-shared communication channels indicated by the non-shared channel list user interface element 702).

In some examples, in response to identifying the identity association between the source profile and the destination profile, the communication platform performs one or more profile reconciliation routines with respect to the source profile and the destination profile. Examples of three sets of profile reconciliation routines include cross-profile communication history integration routines, cross-profile personal data integration routines, and cross-profile data integration routines. However, a person of ordinary skill in the relevant technology will recognize that other profile reconciliation routines (e.g., other cross-profile data integration routines for content data other than communication history streams, personal data objects, and referential data objects) may be performed as part of a profile reconciliation process. For example, in some examples, in response to identifying the identity association, the communication platform modifies a source ownership indicator of content data associated with the source profile to transfer ownership of the content data to the destination profile. The source ownership indicator may include an indicator that describes which user profiles have access to a particular corresponding data object. The source ownership indicator for a data object may be statically defined and/or may be determined dynamically based on one or more access privilege rules of a data retrieval system (e.g., a communication system) associated with the data object.

At operation 404, in response to identifying the identity association, the communication platform performs a cross-profile communication history integration between the source profile and the destination profile. The cross-profile communication history integration may include one or more computer-implemented processes configured to integrate communication history streams associated with two or more user profiles (e.g., a source communication history stream associated with a source profile and a corresponding destination communication history stream associated with a destination profile). For example, a cross-profile communication history integration may be configured to integrate a source communication history stream associated with a source profile into a corresponding destination communication history stream associated with a destination profile. For another example, a cross-profile communication history integration may be configured to merge a source communication history stream associated with a source profile and a corresponding destination communication history stream associated with a destination profile in order to generate an integrated communication history stream for the source profile and the destination profile.

In some examples, performing the cross-profile communication history integration includes identifying a source communication history stream associated with the source profile and a corresponding destination communication history stream associated with the destination profile and integrating respective data objects (e.g., messages transmitted from the source profile and the destination profile). Source communication data objects may include messages sent by the user from the guest profile. The communication platform may identify the messages sent from the guest profile objects and, prior to the profile reconciliation, may present the message via the respective communication channel (or direct message instance) as being from the guest profile. For example, the communication platform may present a message (e.g., source communication data object) as being transmitted by "Guest Jane." Responsive to profile reconciliation, the communication platform can reconcile the source profile and the destination profile to present messages as being transmitted by a member with full access privileges (e.g., destination communication data object). For example, the communication platform may present the previously sent message as a destination communication data object transmitted by "Jane" in lieu of "Guest Jane." Accordingly, at the completion of the profile reconciliation, data transmitted by "Jane" via either the source profile or the destination profile, may be accessible to members of the communication channel.

The source communication history stream may include a data object that describes information about a set of communications between a source profile and one or more recipient profiles. For example, a source communication history stream may include information about a private message thread comprising private communications of a source profile with another user profile. For another example, a source communication history stream may include information about a group message thread comprising group communications of a source profile with user profiles in a particular user profile group. For yet another example, a source communication history stream may include information about a group of messages associated with a communication channel, where the communication channel is associated with a source profile. In some examples, subsequent to performing the cross-profile communication history integration, the communication platform generates a destination stream communication interface that is configured to be accessible by a client device associated with the destination profile. The destination stream communication interface may include a user interface that is configured to display data associated with one or more destination communication history streams. For example, a destination stream communication interface may describe a user interface configured to display private message objects associated with a private message thread in a temporal order. For another example, a destination stream communication interface may describe a user interface configured to display group message objects associated with a group message thread in a temporal order. For yet another example, a destination stream communication interface may describe a user interface configured to display communication channel messages associated with a communication channel in a temporal and/or hierarchical order.

In some examples, subsequent to performing the cross-profile communication history integration, the communication platform generates a destination stream communication interface that is configured to display the destination communication history stream. The destination communication history stream may include a data object that describes information about a set of communications between a destination profile and one or more recipient profiles. For example, a destination communication history stream may include information about a private message thread comprising private communications of a destination profile with another user profile. For another example, a destination communication history stream may include information about a group message thread comprising group communications of a destination profile with user profiles in a particular user profile group. For yet another example, a destination communication history stream may include information about a group of messages associated with a communication channel, where the communication channel is associated with a destination profile.

In some examples, to determine that a destination communication history stream corresponds to a particular source communication history stream, the communication platform determines that one or more non-destination-profile user profiles associated with the destination communication history stream are the same as the one or more non-source-profile user profiles associated with the source communication history stream. In other words, the communication platform determines that the two communication history stream associated with two different user profiles correspond to each other if: (i) at least one first user profile associated with the first communication history stream has an identity association with at least one second user profile associated with the second communication history stream, and (ii) other than the first user profile and the second user profile, the two communication history streams have the same set of associated user profiles. In some examples, to determine that a destination communication history stream corresponds to a particular source communication history stream, the communication platform utilizes one or more additional predictive signals about whether a destination communication history stream corresponds to a particular source communication history stream, e.g., one or more additional predictive signals defined based on at least one of subject designators of the two communication history streams, the content data associated with the two communication history streams, the timings of the two communication history streams etc.

In some examples, integrating the one or more source communication data objects into the one or more destination communication data objects is performed based on source temporal markers associated with the one or more source communication data objects and destination temporal markers associated with the one or more destination communication data objects. A source temporal marker a timestamp associated with a corresponding source communication data object. For example, a source temporal marker may indicate a time of transmission of a source communication data object. For another example, a source temporal marker may indicate the latter of a time of transmission of a source communication data object and a time of a latest revision of a source communication data object. For yet another example, a source temporal marker may indicate a time of first receipt of a source communication data object. A timestamp may indicate a date and/or clock time of a corresponding point in time. A destination temporal marker may include a timestamp associated with a corresponding destination communication data object. For example, a destination temporal marker may indicate a time of transmission of a destination communication data object. For another example, a destination temporal marker may indicate the latter of a time of transmission of a destination communication data object and a time of a latest revision of a destination communication data object. For yet another example, a destination temporal marker may indicate a time of first receipt of a destination communication data object.

In some examples, to integrate the one or more source communication data objects into the one or more destination communication data objects, the communication platform can merge the one or more source communication data objects and the one or more destination communication data objects into an integrated list, where the order of the communication data objects in the integrated list is determined based on an ascending or descending order of timestamps associated with the noted communication data objects. Thereafter, the communication platform can update the one or more destination communication objects based on the integrated list with the noted temporal order.

Figure 8:
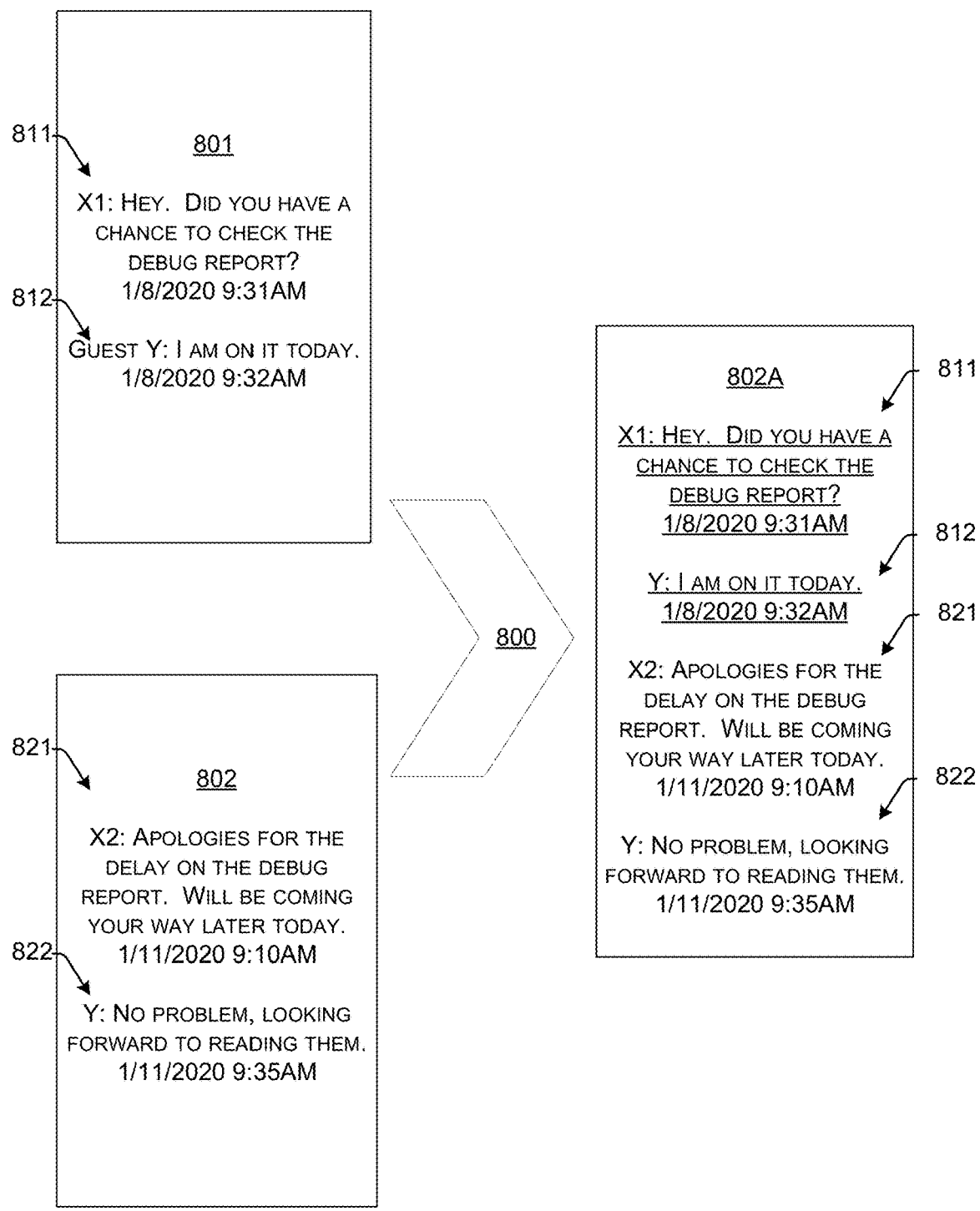
FIG. 8 is an operational example of a temporal communication data object integration process according to some examples of the present disclosure.

An operational example of a temporal communication data object integration process 800 is depicted in FIG. 8. As depicted in FIG. 8, the temporal communication data object integration process 800 is configured to receive as inputs a source communication history stream 801 associated with source communication data objects 811-812 as well as a destination communication history stream 802 associated with destination communication data objects 821-822. In the illustrative example, the source communication history stream 801 includes a message between a first member X1 and a guest of the communication channel "Guest Y" and the destination communication history stream 802, generated after profile reconciliation, includes messages between a second member X2 and Y, now a full member of the communication channel.

As further depicted in FIG. 8, the temporal communication data object integration process 800 is configured to process the source communication history stream 801 and the destination communication history stream 802 to integrate the source communication data objects 811-812 into destination communication data objects 821-822 in order to update the destination communication history stream 802A. In accordance with the temporal communication data object integration process 800 of FIG. 8, because the temporal markers of the source communication data objects 811-812 are temporally precedent to the temporal markers of the destination communication data objects 821-822, subsequent to the integration of the source communication data objects 811-812 into destination communication data objects 821-822, the source communication data objects 811-812 appear before the destination communication data objects 821-822. As illustrated, the updated destination communication history stream 802 indicates that Y is a member with full access privileges (e.g., no longer associated with "Guest"). In some examples, the indication that Y is a member with full access privileges may include a presentation of a username, nickname, avatar, or the like. In at least one example, the indication that Y is a member with full access privileges can include a removal of the word "Guest" in association with the messages.

Returning to FIG. 4, at operation 406, in response to identifying the identity association, the communication platform performs a cross-profile personal data integration for the source profile and the destination profile. In some examples, the cross-profile personal data integration can be an optional step in the process 400. In some examples, to perform the cross-profile personal data integration for the source profile and the destination profile, the communication platform identifies one or more personal data objects associated with the source profile, where each personal data object of the one or more personal data objects is associated with a personal data object user identifier, and where each personal data object user identifier of a personal data object of the one or more personal data objects indicates a source identifier associated with the source profile. The personal data object may include a data object that describes content data associated with a user profile that is not shared with any other user profile of a communication platform. Examples of personal data objects include bookmark data objects, reminder data objects, note data objects, saved-link data objects, etc. In some examples, subsequent to identifying the one or more personal data objects associated with the source profile, the communication platform modifies the personal data object user identifier of the personal data objects to indicate a destination identifier associated with the destination profile. The personal data object user identifier may include an identifier that uniquely identifies a user profile associated with a corresponding personal data object. For example, a personal data object user identifier associated with a bookmark data object may be a data object that describes a user profile that has requested generating a bookmark associated with the bookmark data object. For another example, a personal data object user identifier for a reminder data object is a data object that describes a user profile that has requested generating a reminder associated with the reminder data object. For yet another example, a personal data object user identifier for a note data object is a data object that describes a user profile that has requested generating a note associated with the note data object. For yet a further example, a personal data object user identifier for a saved-link data object is a data object that describes a user profile that has requested generating a saved link associated with the saved-link data object.

In some examples, to perform the cross-profile personal data integration for the source profile and the destination profile, the communication platform associates bookmark data objects associated with the source user profile to the destination user profile. For another example, in some examples, to perform the cross-profile personal data integration for the source profile and the destination profile, the communication platform may associate reminder data objects associated with the source user profile to the destination user profile. For yet another example, in some examples, to perform the cross-profile personal data integration for the source profile and the destination profile, the communication platform associates note data objects associated with the source user profile to the destination user profile. As a further example, in some examples, to perform the cross-profile personal data integration for the source profile and the destination profile, the communication platform associates saved-link data objects associated with the source user profile to the destination user profile.

In some examples, subsequent to performing the cross-profile personal data integration, the communication platform generates one or more destination personal data interfaces for the one or more personal data objects. A destination personal data interface may include a user interface configured to display data associated with one or more personal data objects. For example, a destination personal data interface may describe a user interface configured to display one or more message bookmarks each associated with a private communication message, a group communication message, a communication message, etc. For another example, a destination personal data interface may describe a user interface configured to display one or more notes data objects associated with a destination profile. For yet another example, a destination personal data interface describes a user interface configured to display one or more notes data objects associated with a destination profile destination profile Each destination personal data interface of the one or more destination personal data interfaces may be configured to be accessible by a client device associated with the destination profile. In some examples, to generate the one or more destination personal data interfaces, the communication platform generates user interfaces that, at least in part, enable the destination profile to access destination personal data objects that now include source personal data objects associated with the source profile. In some examples, a destination personal data interface is any user interface that depicts indications of at least one personal data object associated with the destination profile, e.g., at least one bookmark data object associated with the destination profile, at least one saved-link data object associated with the destination profile, at least one reminder data object associated with the destination profile, at least one note data object associated with the destination profile, etc.

At operation 408, in response to identifying the identity association, the communication platform can perform a cross-profile data integration for the source profile and the destination profile. In some examples, the cross-profile data integration can be an optional step in the process 400. In some examples, to perform the cross-profile data integration for the source profile and the destination profile, the communication platform identifies one or more data objects associated with the source profile. In some examples, the cross-profile data integration can include a cross-profile data integration associated with one or more referential data objects. The referential data object(s) include data object(s) (e.g., a corresponding message data object) with a reference to a corresponding user profile and/or to a message object associated with (e.g., authored by) the corresponding user profile. For example, a particular referential data object may describe that a corresponding message data object (e.g., a message) has tagged (e.g., @ mentioned) a corresponding user profile. For another example, a particular referential data object may describe that a corresponding message data object has linked to content data (e.g., authored by) associated with a corresponding user profile.

In some examples, each referential data object of the one or more referential data objects may be associated with a referential data object user identifier. In such examples, each referential data object user identifier of a referential data object of the one or more referential data objects indicates the source identifier associated with the source profile. The referential data object user identifier may include an identifier that uniquely identifies a user profile referenced by a corresponding referential data object. For example, the referential data object user identifier may indicate a user profile that has been tagged (e.g., @ mentioned) by another data object. For another example, the referential data object user identifier may indicate a user profile whose has linked to content data associated with a corresponding user profile. In some examples, subsequent to identifying the one or more referential data objects, the communication platform modifies the referential data object user identifier of each referential data object to indicate a destination identifier associated with the destination profile.

For example, to perform cross-profile data integration for the source profile and the destination profile, the communication platform may modify each message data object that includes a reference the source profile to instead include a reference the destination source profile. For another example, to perform cross-profile data integration for the source profile and the destination profile, the communication server 107 may modify each message data object that includes a link to a first content associated with the source profile to instead include a link to second content associated with the destination source profile. For yet another example, to perform cross-profile data integration for the source profile and the destination profile, the communication platform may modify an author indicator associated with each message data object authored by the source profile to instead indicate that the message data object has been authored by the destination profile.

In some examples, subsequent to performing the cross-profile data integration, the communication platform generates one or more destination referential data interfaces for the one or more referential data objects. A referential data interface may include a user interface configured to display data associated with one or more referential data objects. For example, a referential personal data interface may describe a user interface configured to display one or more messages in which a user has been referenced and/or tagged (e.g., using an @ mention). For another example, a destination personal data interface may describe a user interface configured to display one or more messages in which a message authored by a user has been referenced and/or tagged (e.g., using a share-with-comment functionality and/or a reply-to-message functionality).

Each destination referential data interface of the one or more destination referential data interfaces may be configured to be accessible by a client device associated with the destination profile. In some examples, a destination referential data interface is a user interface accessible to the destination profile that includes at least one referential data object associated with the destination profile, including referential data objects that were previously associated with the source profile. An example of a referential data interface is a user interface that includes all message data objects that have referenced (e.g., tagged) a particular user profile, such as a user interface that includes all message data objects containing @ mentions of a particular user profile.

Figure 9:
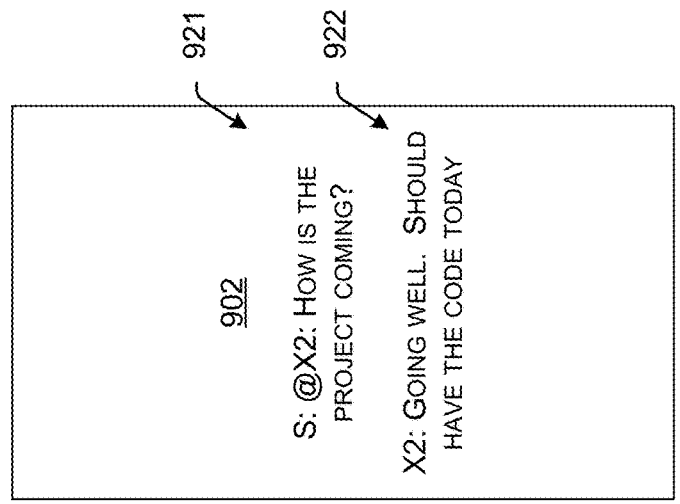
FIG. 9 is an operational example of a cross-profile data integration process according to some examples of the present disclosure.
Figure 9:
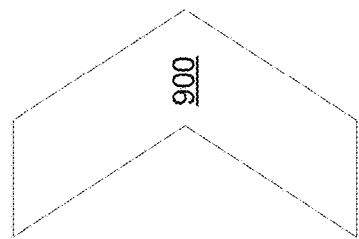
Figure 9:
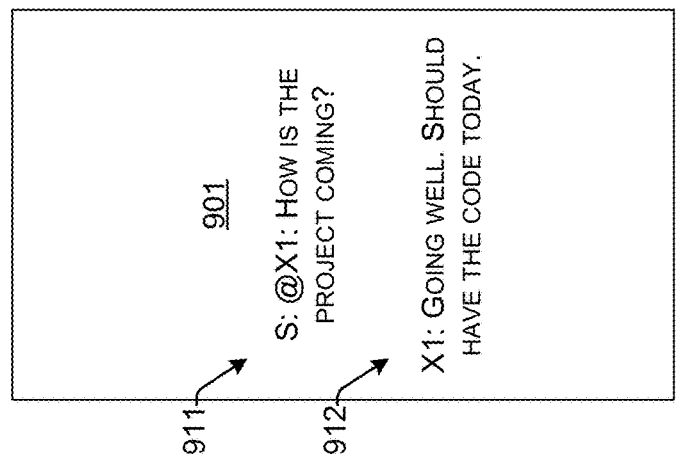

An operational example of a cross-profile data integration process 900 is depicted in FIG. 9. As depicted in FIG. 9, the cross-profile data integration process 900 is configured to receive as input a first communication stream 901 in which a first message data object 911 includes a reference to a source profile X1 and a second message data object 912 which is a message authored by the source profile X1. As further depicted in FIG. 9, by processing the first communication stream 901, the cross-profile data integration process 900 can generate the second communication stream 902 which includes a first message data object 921 corresponding to the first message data object 911 of the first communication stream 901 that includes a reference to the destination profile X2 as well as a second message data object 922 corresponding to the second message data object 912 of the first communication stream 901 that includes a message deemed to be authored by the destination profile X2.

In some examples, after conversion of a non-shared communication channel to a shared communication channel which includes converting at least some of the guest profiles associated with the non-shared communication channel to member-level profiles, the organizational identifier that is associated with the converted user profiles is deemed to have ownership of content data associated with the converted user profiles. In some examples, after the described conversion, the communication server 107 enables the noted organizational identifier to utilize its own encryption keys to encrypt the content data associated with the converted user profiles. In various examples, the communication platform may store and/or encrypt data based at least in part on a policy associated with a corresponding organizational identifier. For example, a non-shared communication channel may be associated with a primary organizational identifier. The communication platform may store data associated with the non-shared communication channel according to a first policy based on the primary organizational identifier. After converting the non-shared communication channel into a shared communication channel, such as based on a request to convert the communication channel, the communication platform may store data associated with the shared communication channel according to the first policy and a second policy associated with a secondary organizational identifier.

Returning to FIG. 4, at operation 410, subsequent to performing at least one of the cross-profile communication history integration at operation 404, the cross-profile personal data integration at operation 406, and the cross-profile data integration at operation 408, the communication platform deactivates the source profile. In some examples, to deactivate the source profile, the communication platform deletes all data associated with the source profile. In some examples, to deactivate the source profile, the communication platform marks all data associated with the source profile as inactive. In some examples, to deactivate the source profile, the communication platform marks the source profile as inactive in a user activity tracking database associated with the communication platform.

In some examples, process 400 is performed as part of converting a communication channel and/or workspace into a shared communication channel and/or workspace. In some examples, to convert a communication channel and/or workspace into a shared communication channel and/or workspace, the communication platform replicates at least a portion of data associated with the communication channel and/or workspace to a secondary organizational profile associated with the shared communication workspace. A transmission flow diagram of an example process 1000 for replicating data on a secondary storage platform 1002 of a secondary organizational profile during conversion of a communication workspace into a shared communication workspace is depicted in FIG. 10.

Figure 10:
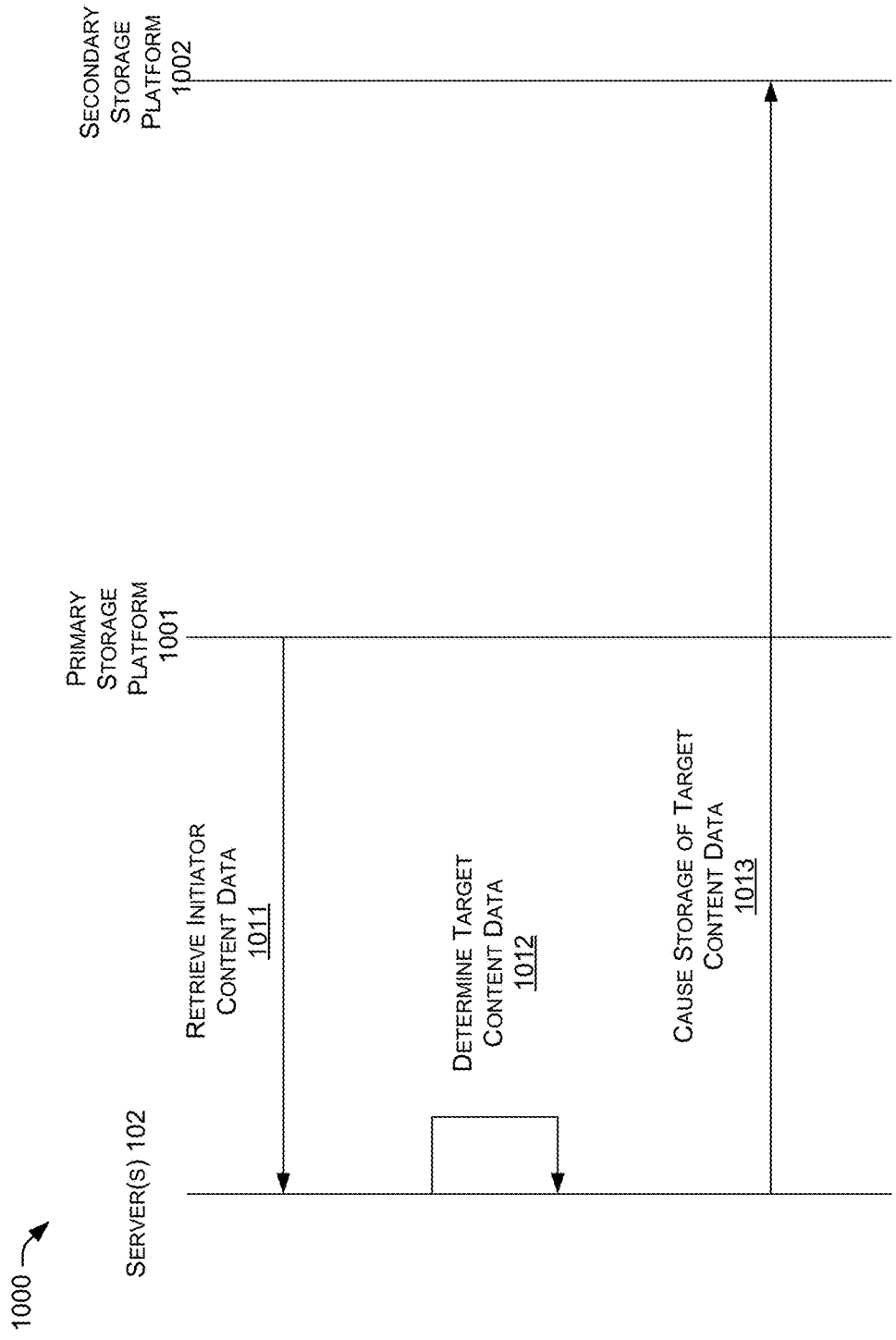
FIG. 10 is a transmission flow diagram of an example process for replicating data on a secondary storage platform during conversion of a group-based communication workspace according to some examples of the present disclosure.

As depicted in FIG. 10, at operation 1011, the communication platform (e.g., server(s) 102) retrieves initiator content data associated with the communication channel from a primary storage platform 1001 associated with a primary organizational identifier for the communication channel. In some examples, to identify the initiator content data, the communication server identifies at least a portion of one or more database shards associated with the communication channel that are stored on the primary storage platform 1001 associated with the primary organizational identifier.

At operation 1012, the communication server(s) 102 determine target content data based on the initiator content data. In some examples, the communication server(s) 102 determine that all of one or more database shards associated with the communication channel and/or a communication workspace as the target content data. In some examples, the communication server(s) 102 determine that a portion of one or more database shards associated with the communication channel that relate to at least one profile associated with the secondary organizational identifier as the target content data.

At operation 1013, the communication server(s) 102 cause the secondary storage platform 1002 associated with the secondary organizational profile for the shared communication workspace to store the target content data. In some examples to cause the secondary storage platform 1002 associated with the secondary organizational profile for the shared communication channel and/or workspace to store the target content data, the communication server(s) 102 transmit the target content data to an application software associated with the secondary storage platform 1002 and request that the application software store the transmitted target content data on the secondary storage platform 1002. In some examples to cause the secondary storage platform 1002 associated with the secondary organizational profile for the shared communication channel and/or workspace to store the target content data, the communication server(s) 102 transmit a link to a storage location of the target content data to an application software associated with the secondary storage platform 1002 and request that the application software download the target content data from the noted storage location and, subsequent to the downloading the noted content target data, store the downloaded target content data on the secondary storage platform 1002.

Figure 11:
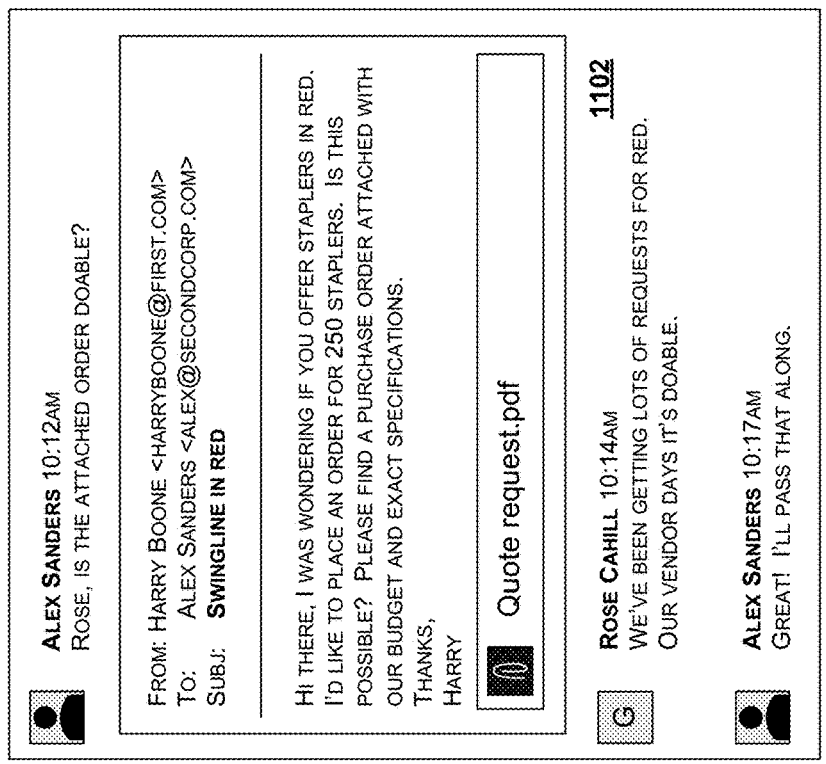
FIG. 11 is an operational example of a user content conversion process according to some examples of the present disclosure.
Figure 11:
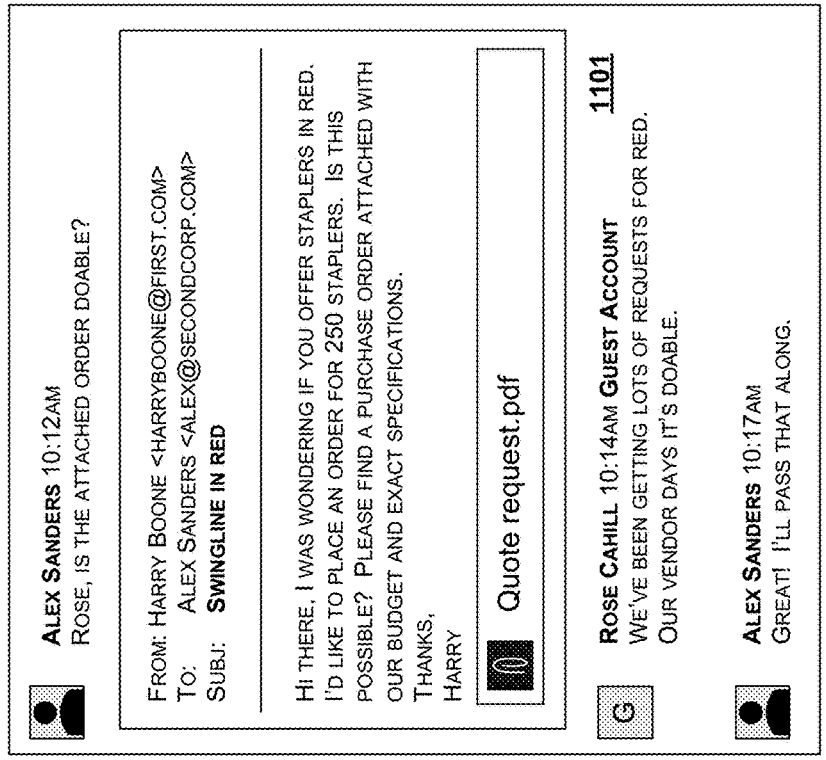

In some examples, the communication server(s) 102 convert user content data associated with a guest user profile to user content data associated with a member-level user profile. In some of the noted examples, as part of the conversion process, the communication server(s) 102 update identifying information associated with the guest user profile to identifying information associated with the member-level user profile. For example, as depicted in FIG. 11, the communication platform can perform a user content conversion process 1100, converting guest-user-profile identifying data 1101 (including the guest-level avatar and the guest marking adjacent to the username of the guest profile) associated with a guest user account of the communication platform to member-level-user-profile identifying data 1102 associated with a member-level-user profile of the communication platform.

Although example processing systems have been described in FIG. 1, examples of the subject matter and the functional operations described herein can be implemented in other types of digital electronic circuitry, or in computer software, firmware, or hardware, including the structures disclosed in this specification and their structural equivalents, or in combinations of one or more of them.

While this specification contains many specific exemplary details, these should not be construed as limitations on the scope of any disclosures or of what may be claimed, but rather as description of features specific to particular examples of particular disclosures. Certain features that are described herein in the context of separate examples can also be implemented in combination in a single example. Conversely, various features that are described in the context of a single example can also be implemented in multiple examples separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

Thus, particular examples of the subject matter have been described. Other examples are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain examples, multitasking and parallel processing may be advantageous.

Many modifications and other examples of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific examples disclosed and that modifications and other examples are intended to be included within the scope of the appended claims. Although specific terms are employed herein, they are used in a generic and descriptive sense only and not for purposes of limitation.

Example Clauses

A: An apparatus for profile reconciliation in a group-based communication system, the apparatus comprising at least one processor and at least one memory, the at least one memory having computer-coded instructions stored thereon, where the computer-coded instructions, in execution with the at least one processor, configure the apparatus to: identify an identity association between a source profile and a destination profile, wherein the source profile and the destination profile are associated with a same user identifier of the group-based communication system; based at least in part on the identity association, perform a cross-profile communication history integration between the source profile and the destination profile, wherein performing the cross-profile communication history integration causes the apparatus to: identify a source communication history stream associated with the source profile and a destination communication history stream associated with the destination profile; and integrate one or more source communication data objects of the source communication history stream into one or more destination communication data objects of the destination communication history stream based at least in part on temporal markers associated with the one or more source communication data objects and the one or more destination communication data objects; and in response to completing the cross-profile communication history integration between the source profile and the destination profile, deactivate the source profile.

B: The apparatus of paragraph A, wherein: the source profile has a limited access privilege with respect to the group-based communication system; and the destination profile has full access privilege with respect to the group-based communication system.

C: The apparatus of either paragraph A or paragraph B, further configured to: receive a request to convert a non-shared communication channel into a shared communication channel; and identify a guest account associated with the non-shared communication channel, wherein the source profile corresponds to the guest account, wherein the identity association is identified based at least in part on the request and an identification of the guest account.

D: The apparatus of paragraph C, wherein: the non-shared communication channel is associated with a primary organizational identifier, the shared communication channel is associated with the primary organizational identifier and a secondary organizational identifier; first content data associated with the non-shared communication channel is encrypted according to a first policy associated with the primary organizational identifier; and second content data associated with the shared communication channel is encrypted according to the first policy and a second policy associated with the secondary organizational identifier.

E: The apparatus of any one of paragraphs A-D, further configured to: based at least in part on the identity association, modify a source ownership indicator of content data associated with the source profile to enable transfer of ownership of the content data to the destination profile.

F: The apparatus of any one of paragraphs A-E, further configured to: generate a destination stream communication interface for the destination communication history stream, wherein the destination stream communication interface is configured to at least one of: be accessible by a client device associated with the destination profile; or display the destination communication history stream.

G: The apparatus of any one of paragraphs A-G, further configured to: perform a cross-profile personal data integration for the source profile and the destination profile based at least in part on the identity association, wherein performing the cross-profile personal data integration causes the apparatus to: identify a personal data object associated with the source profile, the personal data object having associated with a user identifier indicating a source identifier associated with the source profile; and modify the user identifier of the personal data object to indicate a destination identifier associated with the destination profile.

H: The apparatus of any one of paragraphs A-G, further configured to: perform a cross-profile data integration for the source profile and the destination profile based at least in part on the identity association, wherein performing the cross-profile data integration causes the apparatus to: identify a data object associated with the source profile, the data object having associated therewith a user identifier indicating a source identifier associated with the source profile; and modify the user identifier associated with the data object to indicate a destination identifier associated with the destination profile.

I: A computer-implemented method for profile reconciliation in a communication system, the computer-implemented method comprising: identifying an identity association between a source profile and a destination profile, wherein the source profile and the destination profile are associated with a same user identifier of the communication system; based at least in part on the identity association, performing a cross-profile communication history integration between the source profile and the destination profile, wherein performing the cross-profile communication history integration comprises: identifying a source communication history stream associated with the source profile and a destination communication history stream associated with the destination profile; and integrating one or more source communication data objects of the source communication history stream into one or more destination communication data objects of the destination communication history stream based at least in part on temporal markers associated with the one or more source communication data objects and the one or more destination communication data objects; and in response to completing the cross-profile communication history integration between the source profile and the destination profile, deactivating the source.

J: The computer-implemented method of paragraph I, wherein: the source profile has a limited access privilege with respect to the communication system; and the destination profile has full access privilege with respect to the communication system.

K: The computer-implemented method of either paragraph I or paragraph J, further comprising: receiving a request to convert a non-shared communication channel into a shared communication channel; and identifying a guest account associated with the non-shared communication channel, wherein the source profile corresponds to the guest account, wherein the identity association is identified based at least in part on the request and an identification of the guest account.

L: The computer-implemented method of paragraph K, wherein: the non-shared communication channel is associated with a primary organizational identifier, the shared communication channel is associated with the primary organizational identifier and a secondary organizational identifier; first content data associated with the non-shared communication channel is encrypted according to a first policy associated with the primary organizational identifier; and second content data associated with the shared communication channel is encrypted according to the first policy and a second policy associated with the secondary organizational identifier.

M: The computer-implemented method of any one of paragraphs I-L, further comprising: based at least in part on the identity association, modifying a source ownership indicator of content data associated with the source profile to enable transfer of ownership of the content data to the destination profile.

N: The computer-implemented method of any one of paragraphs I-M, further comprising: generating a destination stream communication interface for the destination communication history stream, wherein the destination stream communication interface is configured to at least one of: be accessible by a client device associated with the destination profile; or display the destination communication history stream.

O: The computer-implemented method of any one of paragraphs I-N, further comprising: performing a cross-profile data integration for the source profile and the destination profile based at least in part on the identity association, wherein performing the cross-profile data integration comprises: identifying a data object associated with the source profile, the data object having associated therewith a user identifier indicating a source identifier associated with the source profile; and modifying the user identifier associated with the data object to indicate a destination identifier associated with the destination profile.

P: A system or device comprising: a processor; and a non-transitory computer-readable medium storing instructions that, when executed, cause a processor to perform a computer-implemented method as any one of paragraphs I-O describe.

Q: A system or device comprising: a means for processing; and a means for storing coupled to the means for processing, the means for storing including instructions to configure one or more devices to perform a computer-implemented method as any one of paragraphs I-O describe.

R: One or more non-transitory computer storage media comprising instructions for performing dynamic profile reconciliation in a communication system, the instructions being configured to cause one or more processors to perform operations comprising: identifying an identity association between a source profile and a destination profile, wherein the source profile and the destination profile are associated with a same user identifier of the communication system; based at least in part on the identity association, performing a cross-profile communication history integration between the source profile and the destination profile, wherein performing the cross-profile communication history integration comprises: identifying a source communication history stream associated with the source profile and a destination communication history stream associated with the destination profile; and integrating one or more source communication data objects of the source communication history stream into one or more destination communication data objects of the destination communication history stream based at least in part on temporal markers associated with the one or more source communication data objects and the one or more destination communication data objects; and in response to completing the cross-profile communication history integration between the source profile and the destination profile, deactivating the source profile.

S: The one or more non-transitory computer storage media of paragraph R, wherein: the source profile has a limited access privilege with respect to the communication system; and the destination profile has full access privilege with respect to the communication system.

T: The one or more non-transitory computer storage media of either paragraph R or paragraph S, the operations further comprising: receiving a request to modify a non-shared communication channel into a shared communication channel; and identifying a guest account associated with the non-shared communication channel, wherein the source profile corresponds to the guest account, wherein the identity association is identified based at least in part on the request and an identification of the guest account.

U: The one or more non-transitory computer storage media of paragraph T, wherein the non-shared communication channel is associated with a primary organizational identifier, the shared communication channel is associated with the primary organizational identifier and a secondary organizational identifier; first content data associated with the non-shared communication channel is encrypted according to a first policy associated with the primary organizational identifier; and second content data associated with the shared communication channel is encrypted according to the first policy and a second policy associated with the secondary organizational identifier.

V: The one or more non-transitory computer storage media of any one of paragraphs R-U, the operations further comprising: based at least in part on the identity association, modifying a source ownership indicator of content data associated with the source profile to enable transfer of ownership of the content data to the destination profile.

While the example clauses described above are described with respect to one particular implementation, it should be understood that, in the context of this document, the content of the example clauses may also be implemented via a method, device, system, a computer-readable medium, and/or another implementation.

What is claimed is:

1. An apparatus for profile reconciliation in a group-based communication system, the apparatus comprising at least one processor and at least one memory, the at least one memory having computer-coded instructions stored thereon, where the computer-coded instructions, in execution with the at least one processor, configure the apparatus to:
   identify an identity association between a source profile and a destination profile, wherein the source profile and the destination profile are associated with a same user identifier of the group-based communication system;
   based at least in part on the identity association, perform a cross-profile communication history integration between the source profile and the destination profile, wherein performing the cross-profile communication history integration causes the apparatus to:
  identify a source communication history stream associated with the source profile and a destination communication history stream associated with the destination profile; and
  integrate one or more source communication data objects of the source communication history stream into one or more destination communication data objects of the destination communication history stream based at least in part on temporal markers associated with the one or more source communication data objects and the one or more destination communication data objects;
in response to completing the cross-profile communication history integration between the source profile and the destination profile, deactivate the source profile;
receive a request to convert a non-shared communication channel into a shared communication channel, wherein the non-shared communication channel is associated with a first organizational identifier and the shared communication channel is associated with the first organizational identifier and a second organizational identifier; and
identify a guest account associated with the non-shared communication channel, wherein the source profile corresponds to the guest account, wherein:
  the identity association is identified based at least in part on the request and an identification of the guest account;
  first content data associated with the non-shared communication channel is encrypted according to a first policy associated with the first organizational identifier; and
  second content data associated with the shared communication channel is encrypted according to the first policy and a second policy associated with the second organizational identifier.

2. The apparatus of claim 1, wherein:
the source profile has a limited access privilege with respect to the group-based communication system.

3. The apparatus of claim 2, wherein the destination profile has full access privilege with respect to the group-based communication system.

4. The apparatus of claim 1, wherein the apparatus is further configured to:
based at least in part on the identity association, modify a source ownership indicator of third content data associated with the source profile to enable transfer of ownership of the third content data to the destination profile.

5. The apparatus of claim 1, wherein the apparatus is further configured to:
generate a destination stream communication interface for the destination communication history stream, wherein the destination stream communication interface is configured to:
  be accessible by a client device associated with the destination profile.

6. The apparatus of claim 1, wherein the apparatus is further configured to:
perform a cross-profile personal data integration for the source profile and the destination profile based at least in part on the identity association, wherein performing the cross-profile personal data integration causes the apparatus to:
  identify a personal data object associated with the source profile, the personal data object having associated with a user identifier indicating a source identifier associated with the source profile; and
  modify the user identifier of the personal data object to indicate a destination identifier associated with the destination profile.

7. The apparatus of claim 1, wherein the apparatus is further configured to:
perform a cross-profile data integration for the source profile and the destination profile based at least in part on the identity association, wherein performing the cross-profile data integration causes the apparatus to:
  identify a data object associated with the source profile, the data object having associated therewith a user identifier indicating a source identifier associated with the source profile; and
  modify the user identifier associated with the data object to indicate a destination identifier associated with the destination profile.

8. The apparatus of claim 1, wherein the apparatus is further configured to generate a destination stream communication interface for the destination communication history stream, wherein the destination stream communication interface is configured to display the destination communication history stream.

9. A computer-implemented method for profile reconciliation in a communication system, the computer-implemented method comprising:
identifying an identity association between a source profile and a destination profile, wherein the source profile and the destination profile are associated with a same user identifier of the communication system;
based at least in part on the identity association, performing a cross-profile communication history integration between the source profile and the destination profile, wherein performing the cross-profile communication history integration comprises:
  identifying a source communication history stream associated with the source profile and a destination communication history stream associated with the destination profile; and
  integrating one or more source communication data objects of the source communication history stream into one or more destination communication data objects of the destination communication history stream based at least in part on temporal markers associated with the one or more source communication data objects and the one or more destination communication data objects;
in response to completing the cross-profile communication history integration between the source profile and the destination profile, deactivating the source profile;
performing a cross-profile personal data integration for the source profile and the destination profile based at least in part on the identity association, wherein performing the cross-profile personal data integration comprises:
  identifying a personal data object associated with the source profile, the personal data object having associated with a user identifier indicating a source identifier associated with the source profile; and
  modifying the user identifier of the personal data object to indicate a destination identifier associated with the destination profile;
receiving a request to convert a non-shared communication channel into a shared communication channel, wherein the non-shared communication channel is associated with a first organizational identifier and the shared communication channel is associated with the first organizational identifier and a second organizational identifier; and identifying a guest account associated with the non-shared communication channel, wherein the source profile corresponds to the guest account, wherein:
  the identity association is identified based at least in part on the request and an identification of the guest account;
  first content data associated with the non-shared communication channel is encrypted according to a first policy associated with the first organizational identifier; and
  second content data associated with the shared communication channel is encrypted according to the first policy and a second policy associated with the second organizational identifier.

10. The computer-implemented method of claim 9, wherein:
  the source profile has a limited access privilege with respect to the communication system.

11. The computer-implemented method of claim 10, wherein the destination profile has full access privilege with respect to the communication system.

12. The computer-implemented method of claim 9, further comprising:
  based at least in part on the identity association, modifying a source ownership indicator of third content data associated with the source profile to enable transfer of ownership of the third content data to the destination profile.

13. The computer-implemented method of claim 9, further comprising:
  generating a destination stream communication interface for the destination communication history stream, wherein the destination stream communication interface is configured to:
    be accessible by a client device associated with the destination profile.

14. The computer-implemented method of claim 9, further comprising:
  performing a cross-profile data integration for the source profile and the destination profile based at least in part on the identity association, wherein performing the cross-profile data integration comprises:
    identifying a data object associated with the source profile, the data object having associated therewith the user identifier indicating the source identifier associated with the source profile; and
    modifying the user identifier associated with the data object to indicate the destination identifier associated with the destination profile.

15. The computer-implemented method of claim 9, further comprising generating a destination stream communication interface for the destination communication history stream, wherein the destination stream communication interface is configured to display the destination communication history stream.

16. One or more non-transitory computer storage media comprising instructions for performing dynamic profile reconciliation in a communication system, the instructions being configured to cause one or more processors to perform operations comprising:
  identifying an identity association between a source profile and a destination profile, wherein the source profile and the destination profile are associated with a same user identifier of the communication system;
  based at least in part on the identity association, performing a cross-profile communication history integration between the source profile and the destination profile, wherein performing the cross-profile communication history integration comprises:
    identifying a source communication history stream associated with the source profile and a destination communication history stream associated with the destination profile; and
    integrating one or more source communication data objects of the source communication history stream into one or more destination communication data objects of the destination communication history stream based at least in part on temporal markers associated with the one or more source communication data objects and the one or more destination communication data objects;
  in response to completing the cross-profile communication history integration between the source profile and the destination profile, deactivating the source profile;
  performing a cross-profile data integration for the source profile and the destination profile based at least in part on the identity association, wherein performing the cross-profile data integration comprises:
    identifying a data object associated with the source profile, the data object having associated therewith a user identifier indicating a source identifier associated with the source profile; and
    modifying the user identifier associated with the data object to indicate a destination identifier associated with the destination profile
  receiving a request to convert a non-shared communication channel into a shared communication channel, wherein the non-shared communication channel is associated with a first organizational identifier and the shared communication channel is associated with the first organizational identifier and a second organizational identifier; and
  identifying a guest account associated with the non-shared communication channel, wherein the source profile corresponds to the guest account, wherein:
    the identity association is identified based at least in part on the request and an identification of the guest account;
    first content data associated with the non-shared communication channel is encrypted according to a first policy associated with the first organizational identifier; and
    second content data associated with the shared communication channel is encrypted according to the first policy and a second policy associated with the second organizational identifier.

17. The one or more non-transitory computer storage media of claim 16, wherein:
  the source profile has a limited access privilege with respect to the communication system.

18. The one or more non-transitory computer storage media of claim 17, wherein the destination profile has full access privilege with respect to the communication system.

19. The one or more non-transitory computer storage media of claim 16, the operations further comprising:
  based at least in part on the identity association, modifying a source ownership indicator of third content data associated with the source profile to enable transfer of ownership of the third content data to the destination profile.

20. The one or more non-transitory computer storage media of claim 16, the operations further comprising:
performing a cross-profile personal data integration for the source profile and the destination profile based at least in part on the identity association, wherein performing the cross-profile personal data integration comprises:
identifying a personal data object associated with the source profile, the personal data object having associated with the user identifier indicating the source identifier associated with the source profile; and
modifying the user identifier of the personal data object to indicate the destination identifier associated with the destination profile.

* * * * *